United States Patent [19]
Kondoh et al.

[11] Patent Number: 5,877,602
[45] Date of Patent: Mar. 2, 1999

[54] DRIVING CURCUIT FOR SENSORLESS BRUSHLESS MOTOR

[75] Inventors: Shunichi Kondoh; Toshiya Suzuki, both of Tokyo, Japan

[73] Assignees: Mitsubishi Denki Kabushiki Kaisha; Mitsubishi Electric Engineering Co., Ltd., both of Tokyo, Japan

[21] Appl. No.: 925,431

[22] Filed: Sep. 8, 1997

[30] Foreign Application Priority Data

Apr. 15, 1997 [JP] Japan ..................................... 9-097259

[51] Int. Cl.⁶ ................................................. H02K 23/00
[52] U.S. Cl. .......................... 318/254; 318/439; 318/805; 318/806
[58] Field of Search ..................................... 318/254, 439, 318/805, 806; 363/55, 56, 57, 58

[56] References Cited

U.S. PATENT DOCUMENTS

| 5,182,499 | 1/1993 | Inaji et al. | 318/254 |
| 5,196,771 | 3/1993 | Naito | 318/254 |
| 5,327,053 | 7/1994 | Mann et al. | 318/254 |
| 5,374,880 | 12/1994 | Kondoh et al. | 318/254 |

FOREIGN PATENT DOCUMENTS

| 0347862 | 12/1989 | European Pat. Off. . |
| 055577 | 9/1992 | European Pat. Off. . |
| 0663718 | 7/1995 | European Pat. Off. . |
| 55-147709 | 11/1980 | Japan . |
| 8130892 | 5/1996 | Jordan . |

OTHER PUBLICATIONS

Inoue et al., "An Advanced DC Brushless Servo Drive System With A Fuzzy Logic–Based Self–Tuning Control Scheme And Its Practical Evaluations", Int. J. Electronics. vol. 80, No. 2, 1996, pp. 223–233.

*Primary Examiner*—William M. Shoop, Jr.
*Assistant Examiner*—Rita Leykin
*Attorney, Agent, or Firm*—Leydig, voit & Mayer

[57] ABSTRACT

A sensorless brushless motor driving circuit for a motor having three phases includes a position detecting circuit for detecting the position of the rotor from the terminal voltages of the motor, a commutation switching circuit for generating commutation switching signals based on a position signal from the position detecting circuit, a motor driving transistor circuit for supplying a motor driving currents to the motor in response to driving signals, a buffer circuit for supplying the driving signals according to the commutation switching signals, and a neutral feedback amplifier for detecting a neutral potential of terminal voltages of the motor, comparing the neutral potential with a reference voltage, outputting a first output to the buffer circuit when the neutral potential of the terminal voltages of the motor is higher than the reference voltage and outputting a second output to the buffer circuit when the neutral potential of the terminal voltages of the motor is lower than the reference voltage.

14 Claims, 27 Drawing Sheets

FIG. 5D OUTPUT CURRENT WAVE FORM 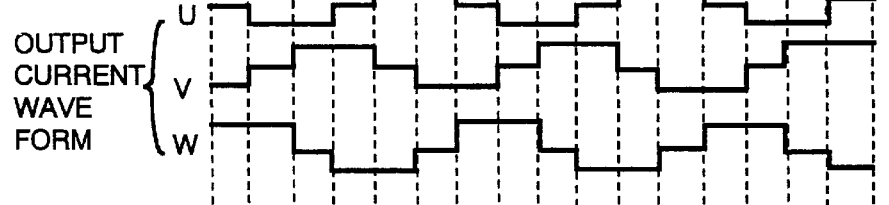
FIG. 5E OUTPUT VOLTAGE WAVE FORM 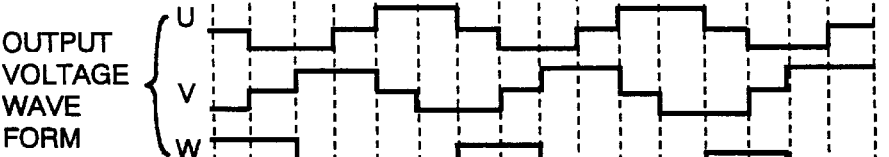

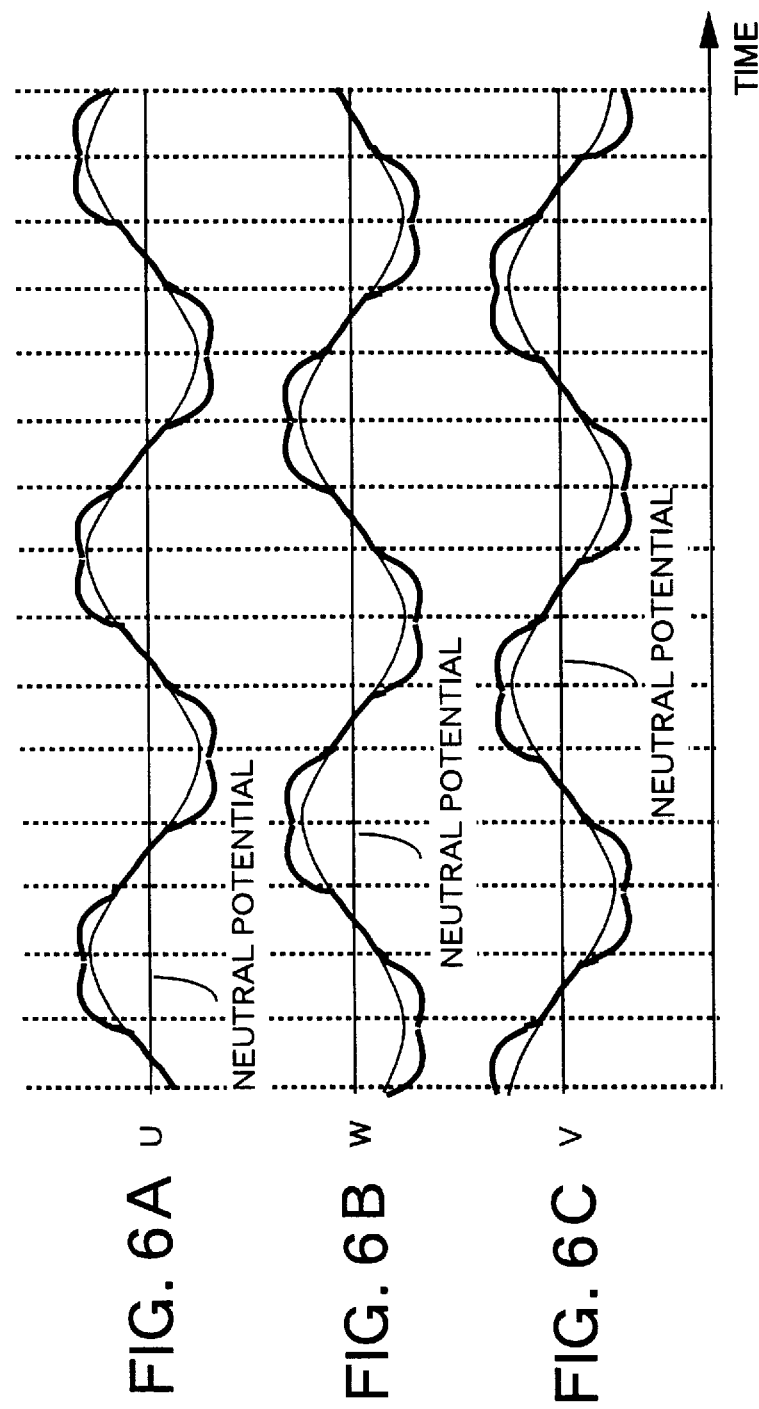

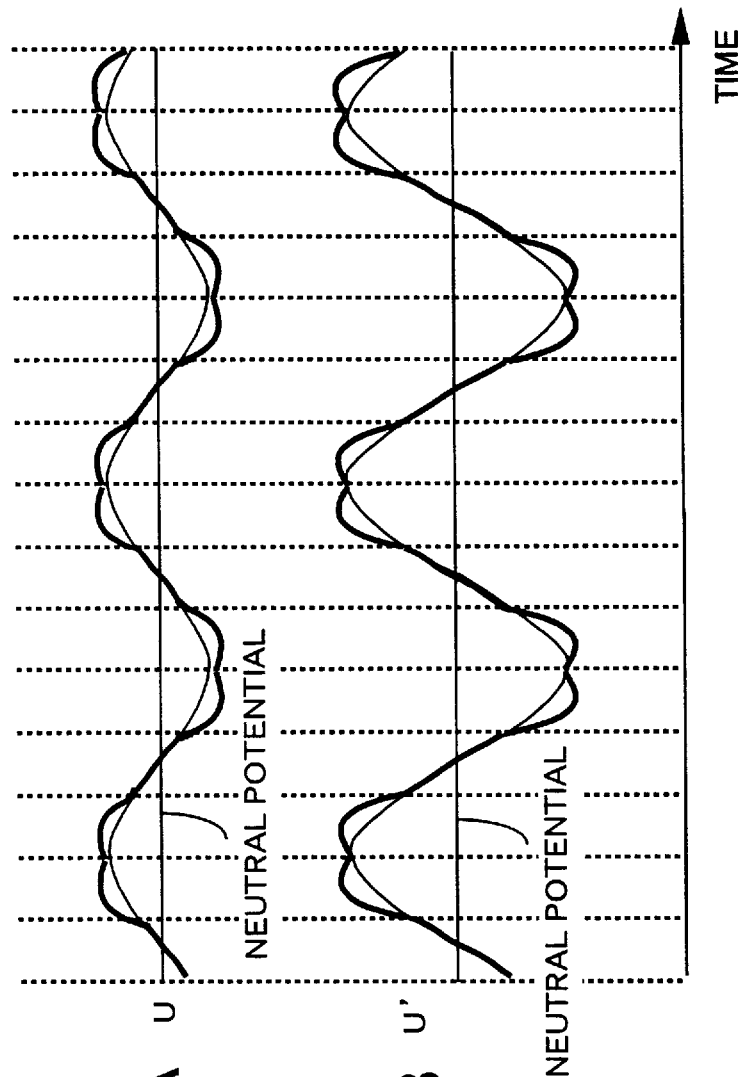

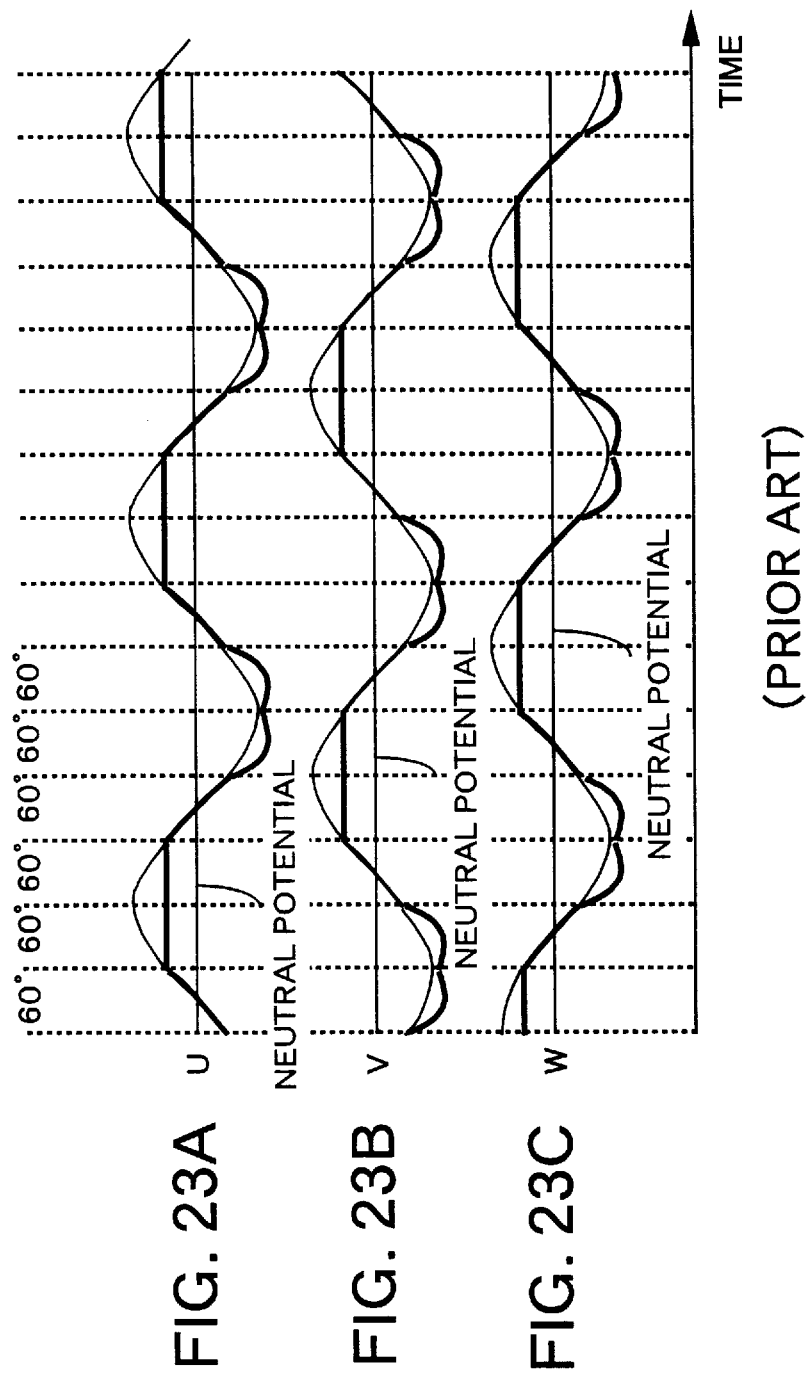

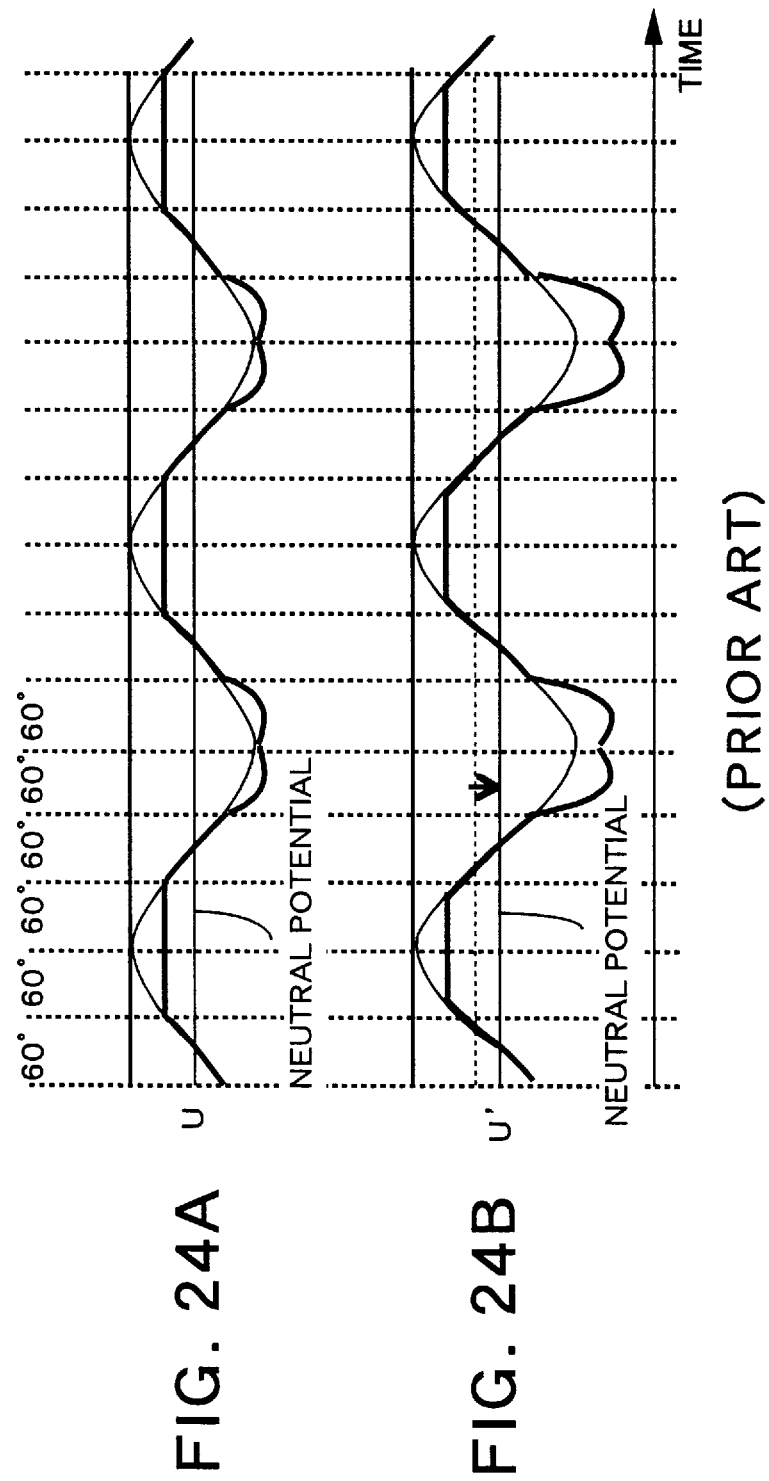

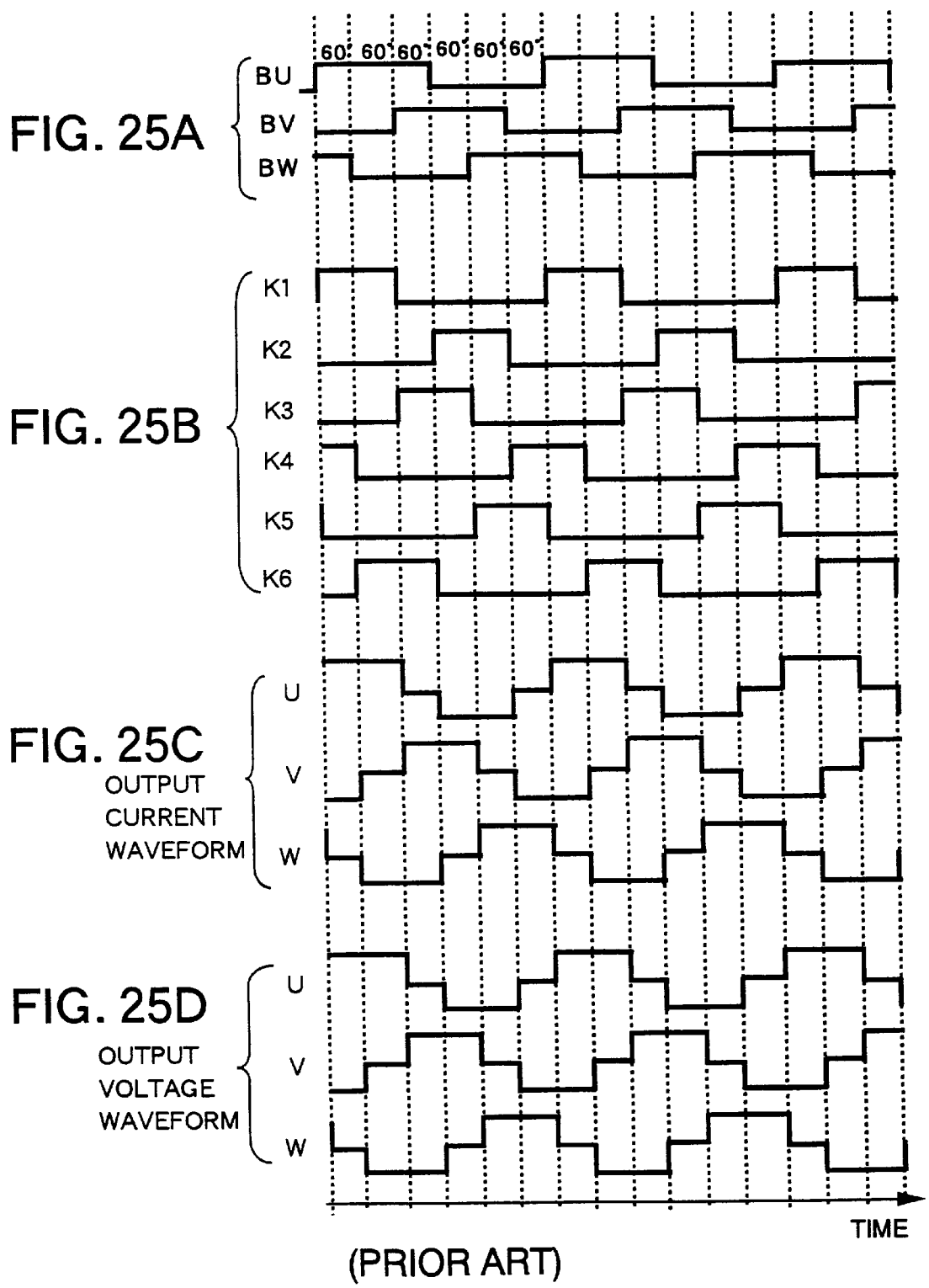

DRIVING CURCUIT FOR SENSORLESS BRUSHLESS MOTOR

BACKGROUND OF THE INVENTION

1. Field of the Invention

The present invention relates to a driving circuit for a sensorless brushless motor. The invention particularly relates to a driving circuit for a sensorless brushless motor which detects accurately a rotational position of a three phase motor by keeping the neutral potential of the three phase motor constant.

2. Description of the Prior Art

FIG. 18 shows a conventional driving circuit for a sensorless brushless motor. In FIG. 18, a terminal voltage compressing circuit 300 receives induced voltages of a three phase motor 10 from terminals U, V, and W and compresses or divides the terminal voltage. A terminal voltage correcting circuit 400 detects the current flowing through the motor 10 via a resistor 108, and corrects the terminal voltage according to the motor current. A position detecting circuit 500 detects the rotational position of the motor. A commutation switching circuit 600 switches a commutation current applied to the motor 10, and turns on or off driving transistors 101–106 in a motor driving transistor circuit 100 to rotate the motor.

In the conventional embodiment shown in FIG. 18, for example, focusing on only the U phase, an output voltage of the upper part of the U phase waveform is saturated, as shown in FIG. 24A. If an output current increases, as shown by U' of FIG. 24B, the bottom of the waveform expands, but the upper part of the waveform does not expand, since the upper part of the waveform is saturated. Therefore, the neutral potential is also shifted downward as shown by the arrow in FIG. 24B. Accordingly, the position of the rotor is detected at a different point. To avoid this difference, the terminal voltage correcting circuit 400 is indispensable.

The operation of the conventional driving circuit of the current sensorless brushless motor is explained using FIG. 18. FIG. 19 shows a detailed circuit of a terminal voltage compressing circuit 300. FIG. 20 shows a detailed circuit of a terminal voltage correcting circuit 400. FIG. 21 shows a detailed circuit of a position detecting circuit 500. FIG. 22 shows a detailed circuit of a commutation switching circuit 600.

A specific construction of the terminal voltage compressing circuit 300 is explained below. FIG. 19 shows only one phase of the terminal voltage compressing circuit 300. The terminal voltage from each terminal of the motor 10 is input to an input terminal 301. The voltage divided by resistors 303 and 305 is output from an output terminal 302, relative to a neutral voltage selected by resistors 304 and 305 connected in series between a power supply 310 and a ground 311. This terminal voltage compressing circuit 300 is arranged to supply an appropriate voltage to an input terminal of the terminal voltage correcting circuit 400. The phase voltages U1, V1, W1 are output from the terminal voltage compressing circuit 300 to the inputs of the terminal voltage correcting circuit 400.

The phase voltages U1, V1, W1 supplied from the terminal voltage compressing circuit 300 are input to the terminal voltage correcting circuit 400 of FIG. 20. The terminal voltage correcting circuit 400 of FIG. 20 includes npn transistors 20–34, a pnp transistor 35, resistors 36–56, and constant current sources 57–60. A U-phase terminal voltage U1 is input to the base of the npn transistor 20, a V-phase terminal voltage V1 is input to the base of the npn transistor 25, and W-phase terminal voltage W1 is input to the base of the npn transistor 30. The base of the pnp transistor 35 is connected to a resistor 108 via a terminal 61. The terminals 62–67 are supplied with correction switching signals for changing the correction of the terminal voltage. The corrected terminal voltages of each phase are output as U2, V2, and W2.

The operation of the terminal voltage correcting circuit 400 is explained below using the drawings. In FIG. 20, the terminal voltage correcting circuit for three phases, U, V, and W, are shown, however, only the U-phase terminal voltage correcting circuit is explained.

Assuming that the terminal 62 and the terminal 63 are at high levels, the collector voltages of the npn transistor 22 and the npn transistor 24 reach 0, so the emitter voltages of the npn transistor 21 and the npn transistor 23 reach 0. Therefore, current does not flow through the resistor 37 or the resistor 40. Accordingly, a current i1 supplied from the constant current source 57 only flows through the resistor 36 (resistance: R1). The voltage at the U-phase output terminal of the terminal voltage correcting circuit 400 is obtained by subtracting the voltage drop of the resistor 36 and the base-emitter voltage (Vbe) of the transistor 20 from the input voltage of the terminal voltage correcting circuit 400 as follows.

$$U2 = U1 - Vbe - R1 \cdot i1 \qquad (1)$$

Assuming that the terminal 62 and the terminal 63 are at low levels, and the voltage Vir is input to the terminal 61. The collector voltages of the npn transistor 21 and the npn transistor 24 become Vir+Vbe (V), so the emitter voltages of the npn transistor 21 and the npn transistor 23 become Vir. Therefore, the current Vir/R2 flows through the resistor 37 (resistance: R2) and the resistor 40 (resistance: R2), respectively. Accordingly, the current flowing through the resistor 36 becomes the sum of the current i1 supplied from the constant current source 57 and the currents flowing through the resistor 37 and the resistor 40. The voltage at the U-phase output terminal of the terminal voltage correcting circuit is obtained from the formula (2) as follows.

$$U1 = U - Vbe - R1 \cdot i1 - R1 \cdot Vir/R2 \qquad (2)$$

If the terminal 62 is at a high level and the terminal 63 is at a low level, or the terminal 62 is at a low level and the terminal 63 is at a high level, since a current of Vir/R2 flows through the resistor 37 or the resistor 40, the voltage at the U-phase output terminal of the terminal voltage correcting circuit is obtained from the formula (3) as follows.

$$U2 = U1 - Vbe - R1 \cdot I1 - R1 \cdot Vir/R2 \qquad (3)$$

Therefore, the terminal voltage can be corrected by setting the terminal 62 and the terminal 63 at a high level when the voltage drop must be added (current direction: V→U, W→U). In the meantime, when the voltage drop must be subtracted (current direction: U→V, U→W), the terminal voltage can be corrected by setting the terminal 62 and the terminal 63 to low levels.

When the U-phase is not a current-carrying phase and does not need to be corrected (current direction: V→W, W→V), the terminal 62 may be set at a high level and the terminal 63 may be set at a low level, or vice versa. In the same way, as for the V-phase, when the voltage drop must be added (current direction: U→V, W→V), the terminal 64 and the terminal 65 may be set at a high level, when the voltage drop is must be subtracted (current direction: V→U, V→W), the terminal 64 and the terminal 65 may be set at a low level, and when no correction is necessary (current direction: U→W, W→U), the terminal 64 may be set at a high level and the terminal 65 may be set at a low level, or vice versa.

Furthermore, as for the W-phase, when the voltage drop must be added (current direction: U→W, V→W), the terminal 66 and the terminal 67 may be set at high levels, when the resistance drop must be subtracted (current direction: W→U, W→V), the terminal 66 and the terminal 67 may be set at low levels, and when no correction is necessary (current direction: U→V, V→U), the terminal 66 may be set at a high level and the terminal 67 may be set at a low level, or vice versa. The conducting phases and the terminals 62–67 as described above are supplied with correction switching signals K1–K6 as shown in the timing chart of FIG. 25B. The correction switching signals K1–K6 are generated, for example, in a commutation switching circuit 600 described later.

The position detecting circuit 500 is explained below using FIG. 21. In FIG. 21, the position detecting circuit 500 comprises resistors 70–81, differential amplification circuits 82–84, and comparators 85–87. The corrected U-phase terminal voltage U2 is applied to a non-inverting input terminal of a differential amplification circuit 82 and an inverting input terminal of a differential amplification circuit 83, via a resistor 70, and a resistor 75, respectively. The corrected W-phase terminal voltage W2 is applied to a non-inverting input terminal of a differential amplification circuit 83 and an inverting input terminal of a differential amplification circuit 84, via a resistor 74, and a resistor 79, respectively. The corrected V-phase terminal voltage V2 is applied to a non-inverting input terminal of a differential amplification circuit 84 and an inverting input terminal of a differential amplification circuit 82, via a resistor 78, and a resistor 71, respectively. The inverting input terminals of differential amplification circuits 82, 83, and 84 are connected to output terminals of the differential amplification circuits 82, 83, and 84 via resistors 73, 77, and 81, respectively. Each output terminal of the differential amplification circuits 82, 83, and 84 is connected to non-inverting input terminals of comparators 85, 86, and 87, respectively. Furthermore, the reference voltage Vref is input to the non-inverting input terminals of the differential amplification circuits 82, 83, and 84 and inverting input terminals of comparators 85, 86, and 87. The differential amplification circuit 82 outputs differential amplification signals U2 and V2 around the center voltage Vref. The comparator 85 compares the differential amplification signal with Vref and outputs a position signal BU. By the same process, position signals BW and BV are obtained. These position signals, BU, BW, and BV shown in FIG. 25A, are supplied to a commutation switching circuit 600 in the next stage.

FIG. 22 illustrates a conventional commutation switching circuit 600. In FIG. 22, the commutation switching circuit 600 comprises input terminals 601–603 where position signals BU, BW, and BV are respectively input. The commutation switching circuit 600 further comprises inverters 604–606, AND gates 611–616 and output terminals 621–626. Each of position signals BU, BW, and BV input to input terminals 601–603 is applied to an input terminal of an AND gate as illustrated in FIG. 22. When position signals BU, BW, and BV shown in FIG. 25A are applied, the commutation switching circuit 600 generates driving signals K1–K6 shown in FIG. 25B according to the logic circuit shown by FIG. 22. These driving signals K1–K6 are applied to the driving transistors 101–106 in the motor driving transistor circuit 100 as shown in FIG. 18 to rotate the motor 10.

FIGS. 26A–26C show the timing relationship between the output of the commutation switching circuit 600 and the U-phase output in a conventional motor driving circuit. The U-phase driving signals K1 and K2 generated by the commutation switching circuit 600 are respectively input to the driving transistors 101 and 104. In FIGS. 26A and 26C, when K1 is at logic "L", the current flows through the driving transistor 101 to generate a positive voltage at the U-phase. On the other hand, in FIGS. 26B and 26C, when K2 is at logic "H", the current flows through the driving transistor 102 to generate a negative voltage at the U-phase.

This circuit detects a current flowing through the motor 10 via the resistor 108. However, in the resistor 108, the base currents of the driving transistors 104–106 flow in addition to the current flowing through the motor 10. Therefore, it is impossible to detect a accurate current flowing only through the motor 10. Accordingly, it is inevitable to correct the terminal voltage according to the motor current. Further, it is impossible to detect accurately the position of the rotor since the errors generated in the terminal voltage compressing circuit 300 are added.

Furthermore, since the transistors 101–106 in the motor driving transistor circuit 100 are switched by the rectangular wave voltage applied to the motor 10 for commutation, a spike voltage shown in FIG. 27 is included in the output voltage. When the spike voltage is in the audible frequency band, it causes the audio noise.

SUMMARY OF THE INVENTION

It is an object of the present invention to provide a motor driving circuit which does not need a terminal voltage correcting circuit changing the neutral potential of a motor using a neutral feedback amplifier, and also to provide a motor driving circuit which reduces the non-uniformity of the rotation of the motor by detecting rotational position of the motor accurately, using the induced voltage of the motor.

It is a further object of the present invention to reduce a spike voltage generated in response to quick switching by gradually changing the switching current flowing through the driving transistor, to reduce audible noise of the motor.

According to one aspect of the invention, a sensorless brushless motor driving circuit includes a buffer circuit for supplying the driving signals to drive the motor in response to the commutation switching signals from the commutation switching circuit; and a neutral feedback amplifier for detecting a neutral potential of the terminal voltages of the motor, comparing the neutral potential with a reference voltage, outputting a first output to the buffer circuit when the neutral potential is higher than the reference voltage, and outputting a second output to the buffer circuit when the neutral potential is lower than the reference voltage wherein the buffer circuit lowers the neutral potential when the neutral potential is higher than the reference voltage, and raises the neutral potential when the neutral potential is lower than the reference voltage.

According to another aspect of the invention, a sensorless brushless motor driving circuit includes a neutral feedback amplifier for detecting a neutral potential of terminal voltages of the motor, comparing the neutral potential with a reference voltage, outputting a first output to the buffer circuit when the neutral potential is higher than the reference voltage, and outputting a second output to the buffer circuit when the neutral potential is lower than the reference voltage; a phase signal generating circuit for generating a phase signal based on the position signal; a trapezoidal phase signal generating circuit for generating a trapezoidal phase signal in response to the phase signal; a commutation switching control signal generating circuit for generating commutation switching control signals in response to the position signal; and a soft switching circuit for generating the commutation switching signals in response to the trapezoidal phase signal and the commutation switching control signals wherein the buffer circuit lowers the neutral potential when the neutral potential is higher than the reference voltage and raises the neutral potential when the neutral potential is lower than the reference voltage.

According to a further aspect of the invention, a neutral feedback amplifier of the sensorless brushless motor driving circuit includes first and second differentially connected transistors; a reference source producing a reference voltage and connected to a base of the first transistor; and means connecting a base of the second transistor to terminals of the motor for detecting a neutral potential.

According to a further aspect of the invention, a neutral feedback amplifier of the sensorless brushless motor driving circuit includes third and fourth transistors connected to a collector of the first transistor forming a first current-mirror circuit, fifth and sixth transistors connected to a collector of the second transistor forming a second current-mirror circuit, and seventh and eighth transistors connected to a collector of the sixth transistor forming a third current-mirror circuit.

According to a further aspect of the invention, a buffer circuit of the sensorless brushless motor driving circuit includes a buffer for every phase, each buffer receiving a commutation switching signal from the commutation switching circuit and first and second control signals from the neutral feedback amplifier, outputting first and second driving signals for driving the motor driving transistor circuit according to the commutation switching signals from the commutation switching circuit, increasing and decreasing the first driving signal according to the first control signal from the neutral feedback amplifier and increasing and decreasing the second driving signal according to the second control signal from the neutral feedback amplifier.

According to a further aspect of the invention, a first transistor for receiving a commutation switching signal from the commutation switching circuit at a base terminal, and for receiving the first control signal from the neutral feedback amplifier at an emitter terminal, a first current-mirror circuit for supplying a current flowing through a collector terminal of the first transistor to a first output terminal, a second transistor for receiving a commutation switching signal from the commutation stitching circuit at a base terminal, and for receiving the second control signal from the neutral feedback amplifier at an emitter terminal, a second current-mirror circuit taking out current flowing through a collector terminal of the second transistor; and a third current-mirror circuit for supplying a current flowing through the second current-mirror circuit to a second output terminal.

According to a further aspect of the invention, a commutation switching control signal generating circuit of the sensorless brushless motor driving circuit includes a plurality of rising edge detection circuits and falling edge detecting circuits for detecting respective rising and falling of position signals having a U-phase, a V-phase and a W-phase, an OR circuit connected to outputs of the rising edge detecting circuits and the falling edge detecting circuits, and a hexad counter for counting output pulses from the OR circuit.

According to a further aspect of the invention, a soft switching circuit of the sensorless brushless motor driving circuit includes a plurality of first intermediate current supplying circuits and second intermediate current supplying circuits for supplying intermediate currents and the commutation switching signal generating circuit generates commutation switching control signals based on each intermediate current received from the first and second intermediate current supplying circuits.

According to a further aspect of the invention, a phase signal generating circuit of the sensorless brushless motor driving circuit includes a first AND gate for receiving U-phase and V-phase position signals, a second AND gate for receiving V-phase and W-phase position signals, a third AND gate for receiving W-phase and U-phase position signals, and a NOR circuit receiving the output signals of each of the AND gates as input signals.

According to a further aspect of the invention, a trapezoidal phase signal generating circuit of the sensorless brushless motor driving circuit includes a switch turning on and off in response to the phase signal, a first constant current source connected between the power source and a first terminal of the switch, a second constant current source connected between a second terminal of the switch and the ground, and a capacitor connected to the first terminal of the switch and the ground.

BRIEF DESCRIPTION OF THE DRAWINGS

FIGS. 5A–5E arc timing charts showing the operation of the first embodiment of the present invention.

FIGS. 6A–6C show output voltage waveforms of a motor of the first embodiment of the present invention.

FIGS. 7A–7B show terminal voltage waveforms of a motor of the first embodiment of the present invention when a motor driving current has changed.

FIGS. 23A–23C show prior art terminal voltage waveforms of a motor.

FIGS. 24A–24B show terminal voltage waveforms of a motor when a motor drive current has changed in a conventional motor driving circuit.

FIGS. 25A–25D are timing charts showing the operation of a conventional motor driving circuit.

DETAILED DESCRIPTION OF THE PREFERRED EMBODIMENTS

Embodiment 1

Figure 1:
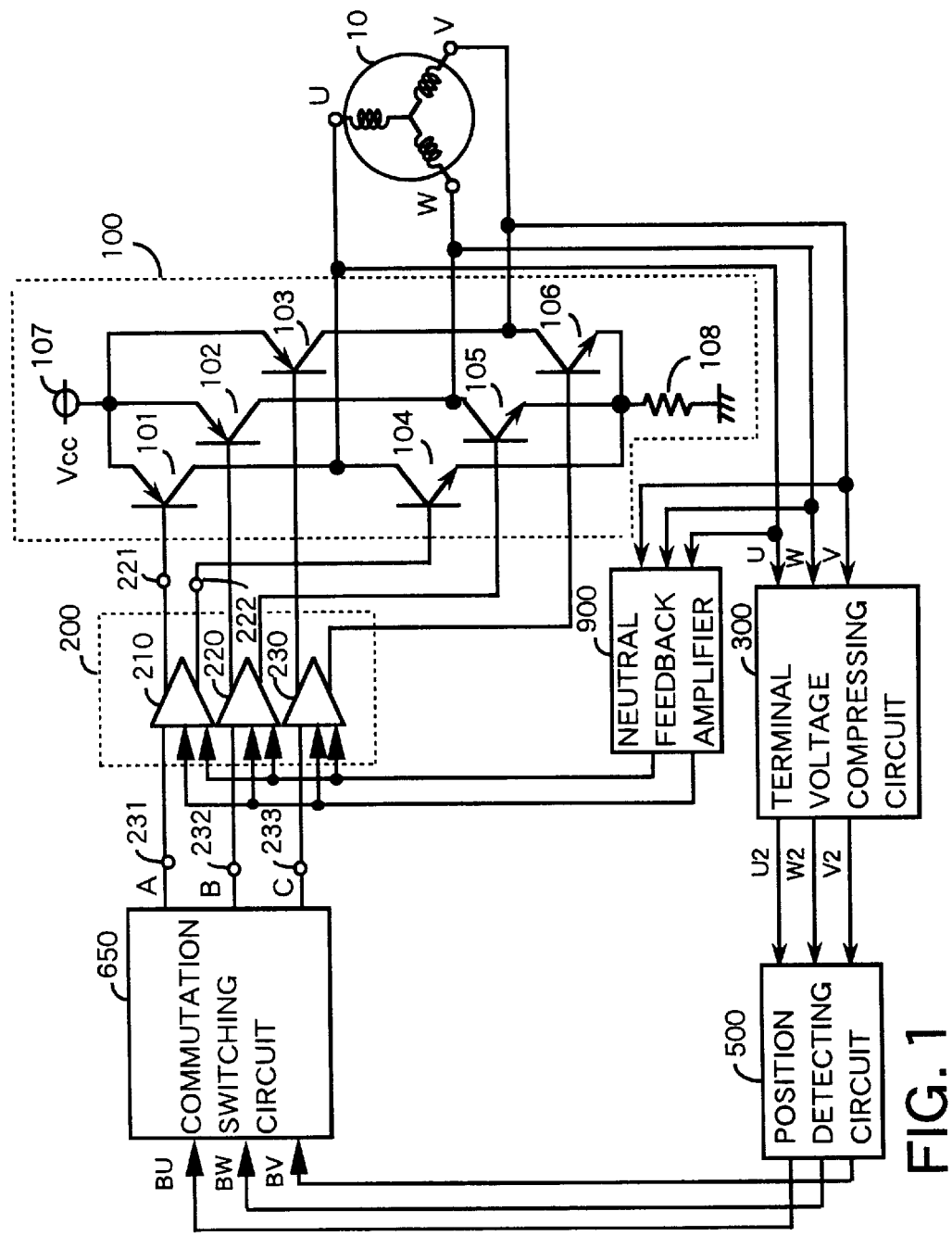
FIG. 1 is shows a driving circuit for a sensorless brushless motor of a first embodiment of the present invention.
Figure 18:
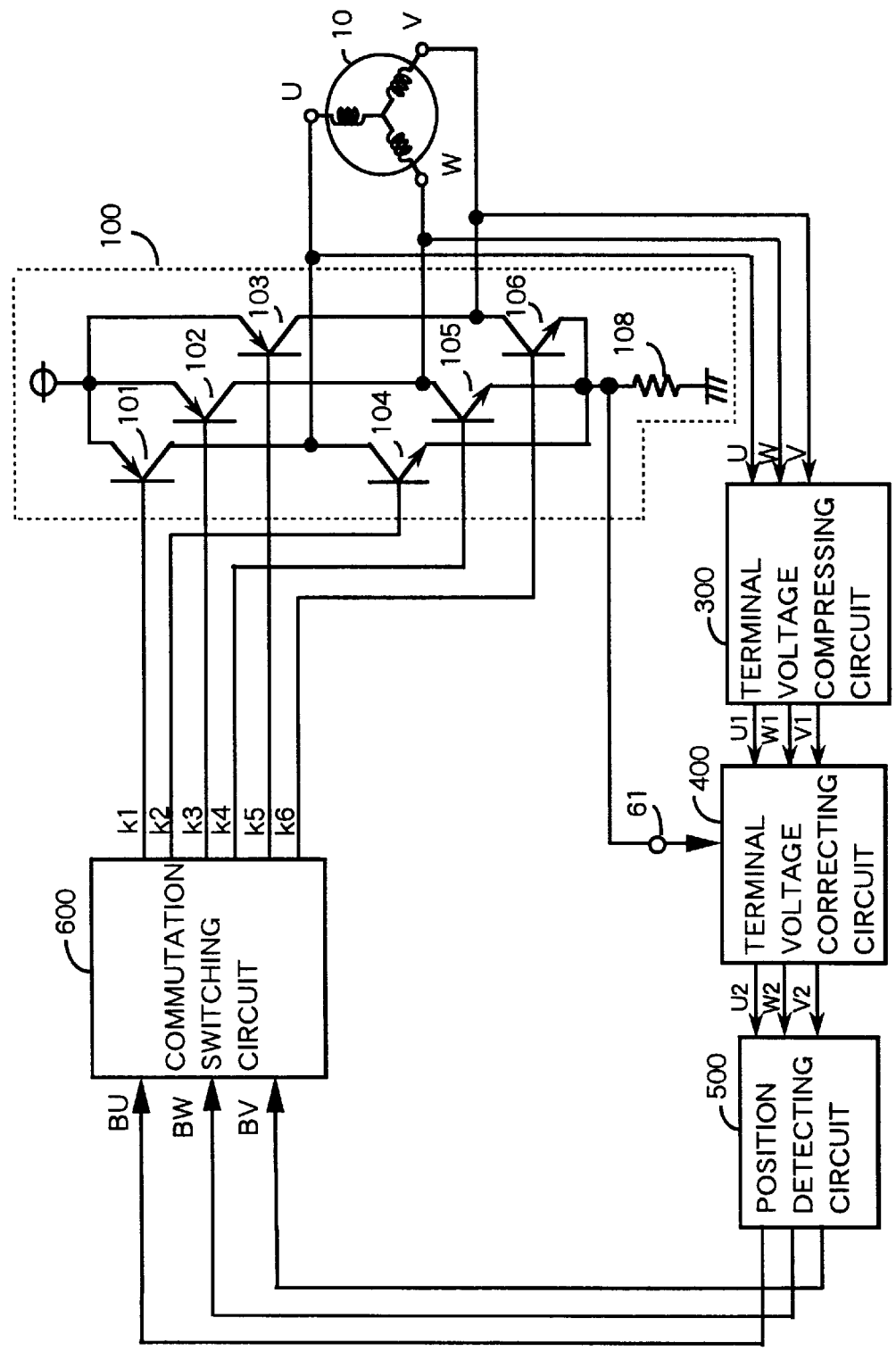
FIG. 18 shows a conventional driving circuit for a sensorless brushless motor.

FIG. 1 is a block diagram showing a sensorless brushless motor driving circuit of the present invention. In the sensorless brushless motor driving circuit of FIG. 1, the terminal voltage correcting circuit 400 of the conventional sensorless brushless motor driving circuit of FIG. 18 is removed, and a neutral feedback amplifier 900 and a buffer circuit 200 are added. The control driving transistors are controlled by this buffer circuit 200. The other features of the sensorless brushless motor driving circuit of the present invention are same as those in the conventional circuit.

The operation of the sensorless brushless motor driving circuit of FIG. 1 is explained below. Since the invention relates to a sensorless brushless motor driving circuit that does not use a position detecting element used in conventional circuit, the position of the rotor in the motor 10 must be detected by another method. As for the detecting means, the induced voltage of the motor is used in the present invention. The waveforms at the terminals U, V, and W in FIG. 1 are shown in FIGS. 6A–6C. The terminal voltages of the motor 10 shown in FIGS. 6A–6C differ from those in the conventional circuits shown in FIGS. 23A–23C, in that there is no saturation in the upper part of each waveform. This is an important feature of the first embodiment of the present invention. Saturation can be eliminated by using a neutral feedback amplifier 900 and a buffer circuit 200 as mentioned later. FIG. 6A shows the terminal voltage of the U-phase, FIG. 6B shows the terminal voltage of the W-phase, and FIG. 6C shows the terminal voltage of the V-phase. In FIGS. 6A–6C, the induced voltages are expanded as illustrated in the thick lines at the upper part and the lower part where the amplitude of the sine waves, shown by the narrow line, is large.

Figure 19:
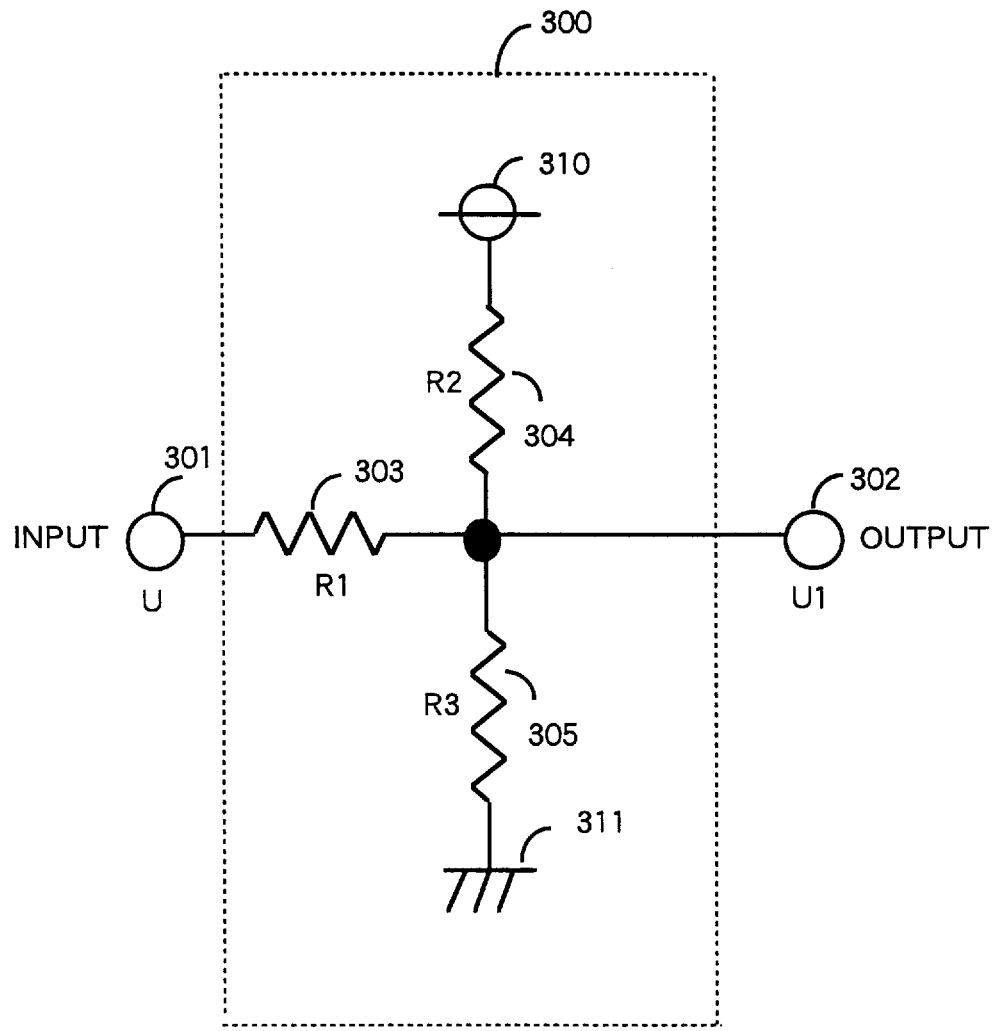
FIG. 19 shows a detailed circuit of a conventional terminal voltage compressing circuit.
Figure 20:
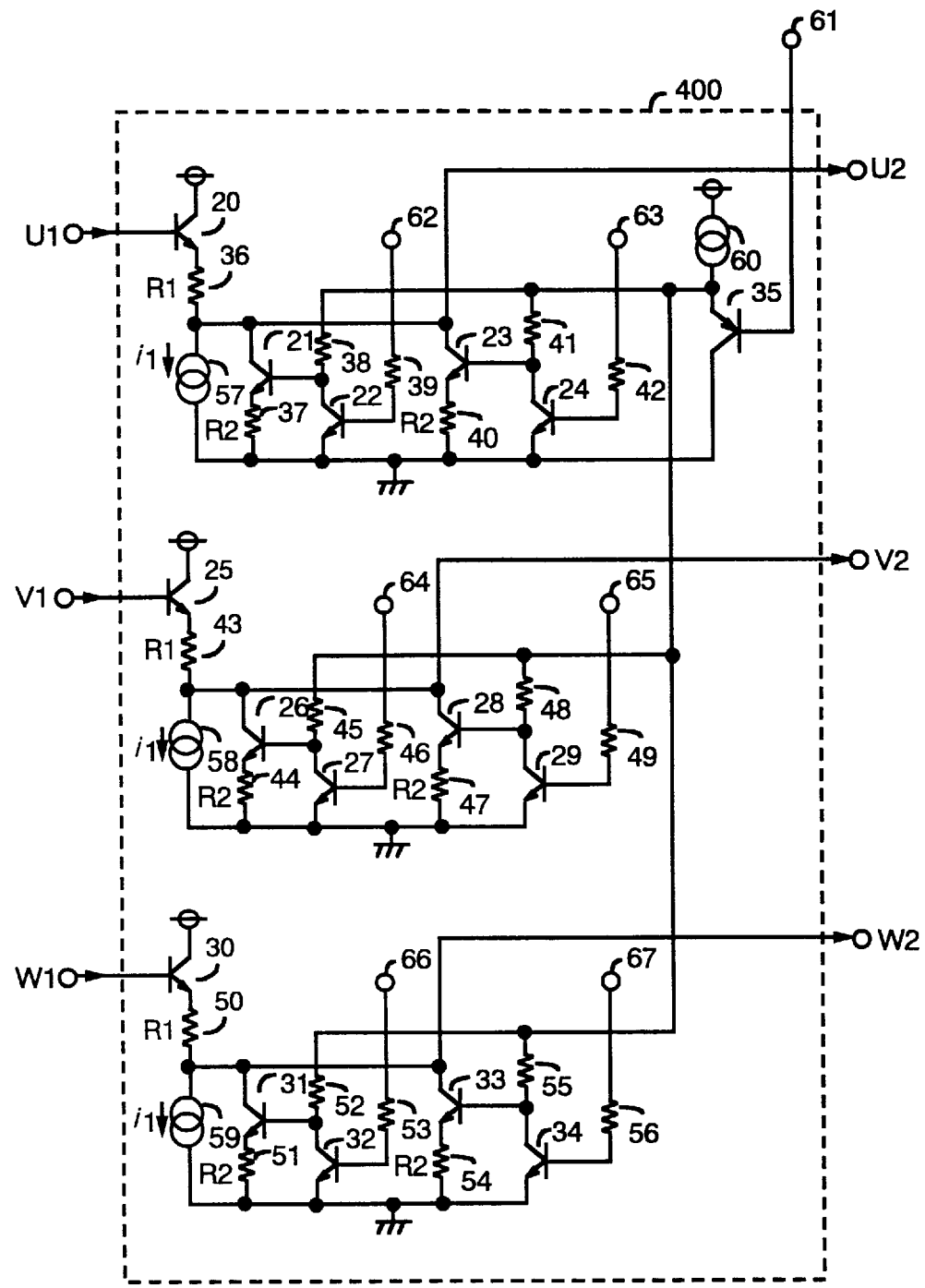
FIG. 20 shows a detailed circuit of a conventional terminal voltage correcting circuit.
Figure 21:
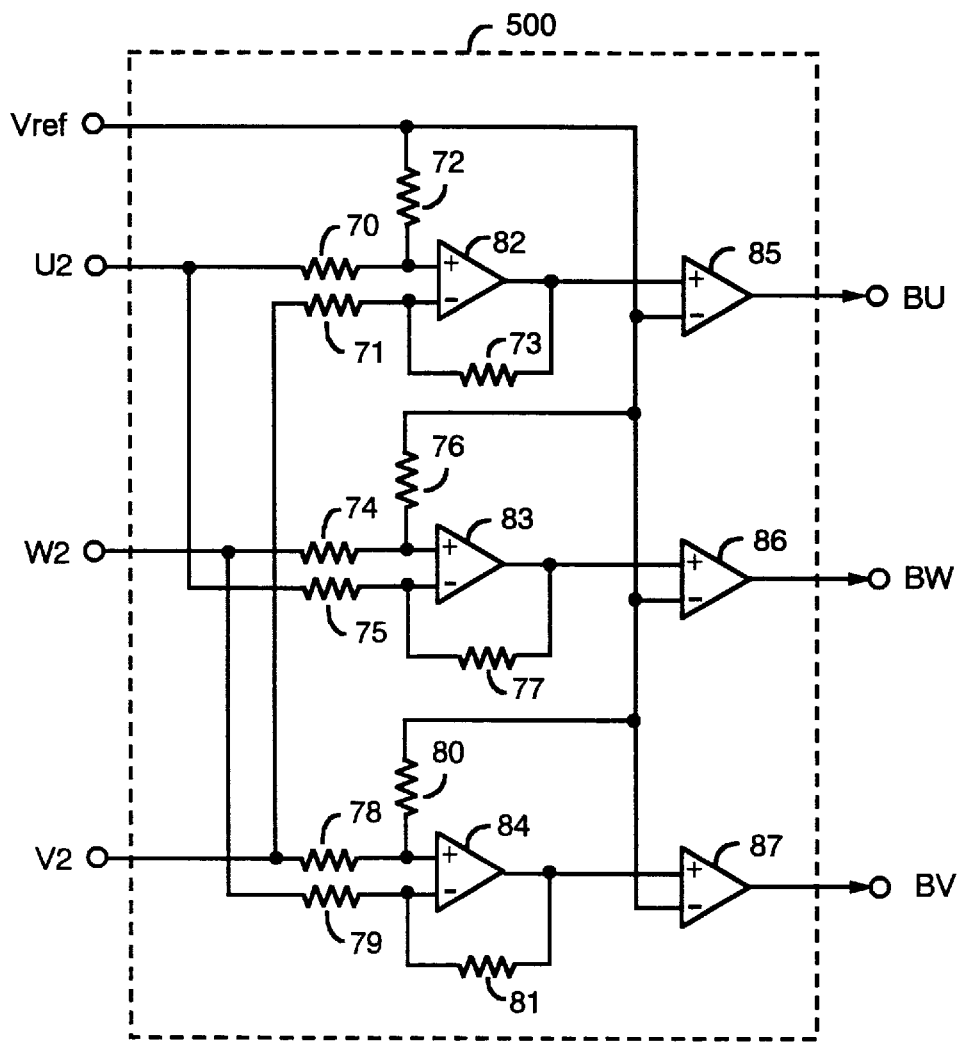
FIG. 21 shows a detailed circuit of a conventional position detecting circuit.
Figure 22:
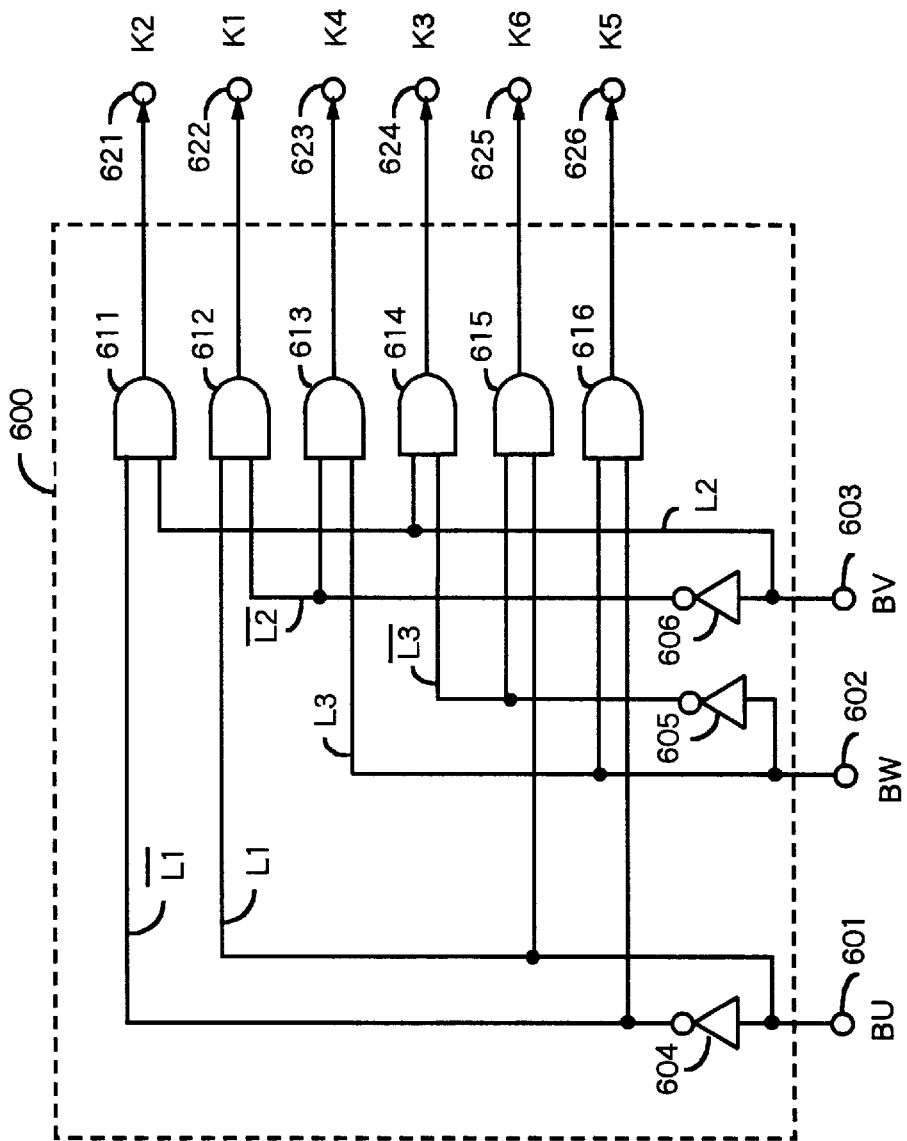
FIG. 22 shows a detailed circuit of a conventional commutation switching circuit.
Figures 26A, 26B, 26C:
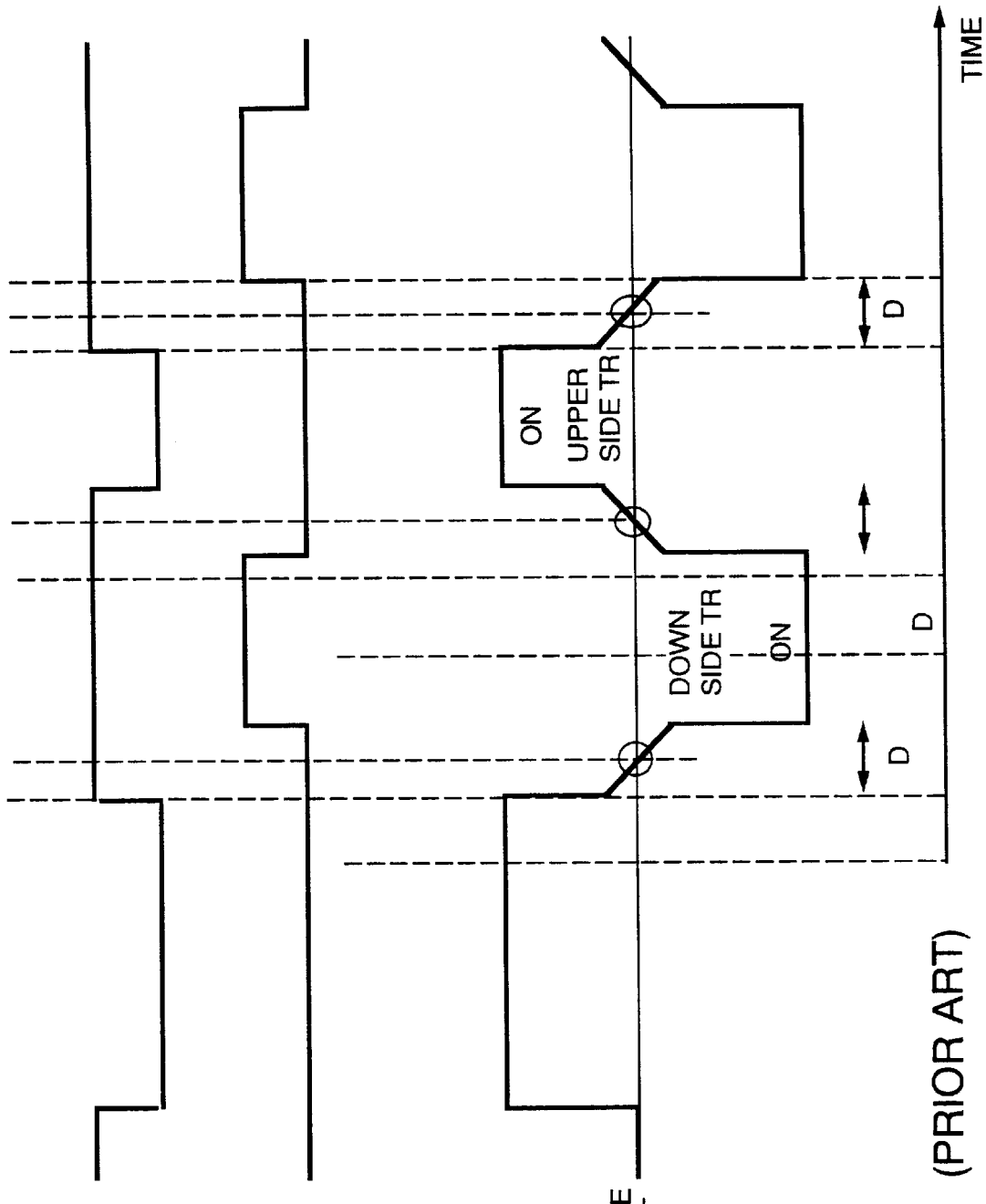
FIGS. 26A–26C show timing relationships between the output of the commutation switching circuit in the conventional motor driving circuit and a U-phase output.
Figure 27:
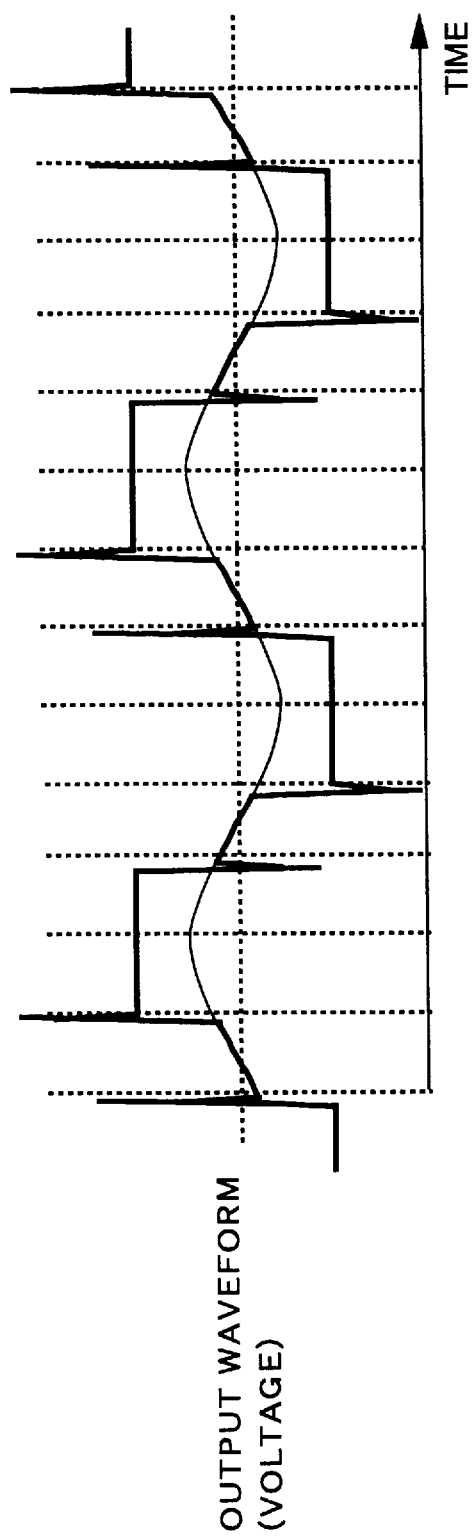
FIG. 27 shows a terminal voltage waveform in a conventional motor.

Receiving the terminal voltages of the motor, a terminal voltage compressing circuit 300 compresses the terminal voltages of the motor into a required voltages. A position detecting circuit 500 detects the position of the rotor in the motor. A commutation switching circuit 650 generates commutation switching signals in response to the detected signal from the position detecting circuit 500. The commutation switching signals is supplied to a motor driving transistor circuit 100 via a buffer circuit 200, and turns on and off driving transistors 101–106 in the driving transistor circuit 100 to rotate the motor 10. Since the terminal voltage compressing circuit 300 and the position detecting circuit 500 are the same as in the conventional circuit of FIG. 19 and FIG. 21, repeated description thereof is not necessary and is omitted.

Receiving the terminal voltages U, V, and W, the neutral feedback amplifier 900 can keep the neutral potential of the motor 10 constant in the invention according to the first embodiment. FIG. 7A shows the terminal voltage when the current flowing through the motor 10 is small, and FIG. 7B shows the terminal voltage when the current flowing through the motor 10 is large. As seen in FIGS. 7A and 7B, even if the current flowing through the motor 10 increases, the neutral potential in the motor 10 does not change, while the output waveforms expand on both sides of the neutral potential. On this account, a conventional terminal voltage correcting circuit 400 is not necessary for the present invention.

Figure 2:
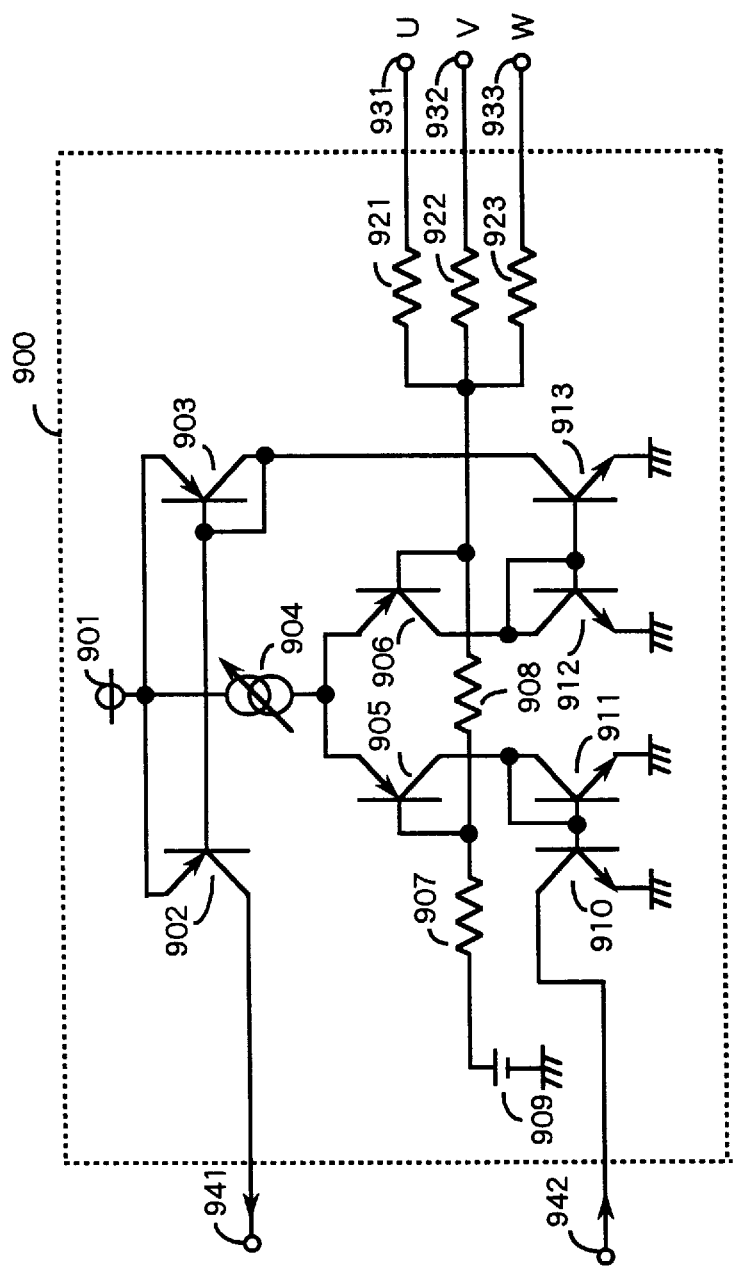
FIG. 2 shows a detailed circuit of a neutral feedback amplifier of the first embodiment of the present invention.

FIG. 2 shows an embodiment of a neutral feedback amplifier 900 of FIG. 1. In FIG. 2, the neutral feedback amplifier 900 comprises a variable current source 904, differential input transistors 905 and 906, resistors 907 and 908 for setting gain, a reference voltage source 909, transistors 910 and 911, 912 and 913, 902 and 903 forming current-mirrors, and resistors 921, 922, and 923 for summing the terminal voltages U, V, and W. This neutral feedback amplifier 900 compares the summed voltages U, V, and W with the reference voltage of the reference voltage source 909, and adjusts the collector current of the transistor 902 and the collector current of the transistor 910 according to the gain determined by the resistors 907 and 908. The details of the operation are described later. The current is supplied to the buffer circuit 200 and the output from the buffer circuit 200 controls the base currents of the driving transistors 101–106 in the motor driving transistor circuit 100. By controlling this base currents, the neutral potential of the U, V, and W-phase voltages can be controlled to be equal to the reference voltage of the reference voltage supply 909. Accordingly, as shown in FIGS. 7A and 7B, even if the motor current increases, the neutral voltage (the reference voltage) does not shift and can be always kept constant.

The operation of the neutral feedback amplifier 900 shown in FIG. 2 is described below. The emitters of the differential input transistors 905 and 906 are supplied with the source voltage from the power supply 901 via the variable current source 904. The collectors of the differential input transistors 905 and 906 are connected to the current-mirrored transistors 910, 911 and 912, 913, respectively. The base of the differential input transistor 905 is connected to the reference voltage supply 909 via the resistor 907. The base of the transistor 906 is connected to the U, V, and W terminals of the motor 10 via the resistors 921, 922, and 923. The respective bases of the transistors 905 and 906 are connected to each other via the resistor 908. Accordingly, the base of the transistor 906 receives the summed voltages U, V, and W (the sum of each voltage in FIGS. 6A–6C) of the motor 10. If the summed voltages at the U, V, and W terminals is higher than the reference voltage of the reference voltage supply 909, more current flows through the transistor 906 than the transistor 905. The current of the transistor 906 flows through the transistor 913 via the current-mirror connected transistor 912. Further, the current flows through the transistor 902 via the current-mirror connected transistor 903. The current flowing through the transistor 902 is supplied to the terminal 211 of the buffer circuit 200 via a terminal 941 as a first control signal.

On the other hand, the current of the transistor 905 flows through the transistor 910 via the current-mirror connected transistor 911. The current flowing through the transistor 910 is supplied to a terminal 212 of the buffer circuit 200 via a terminal 942 as a second control signal.

Figure 4:
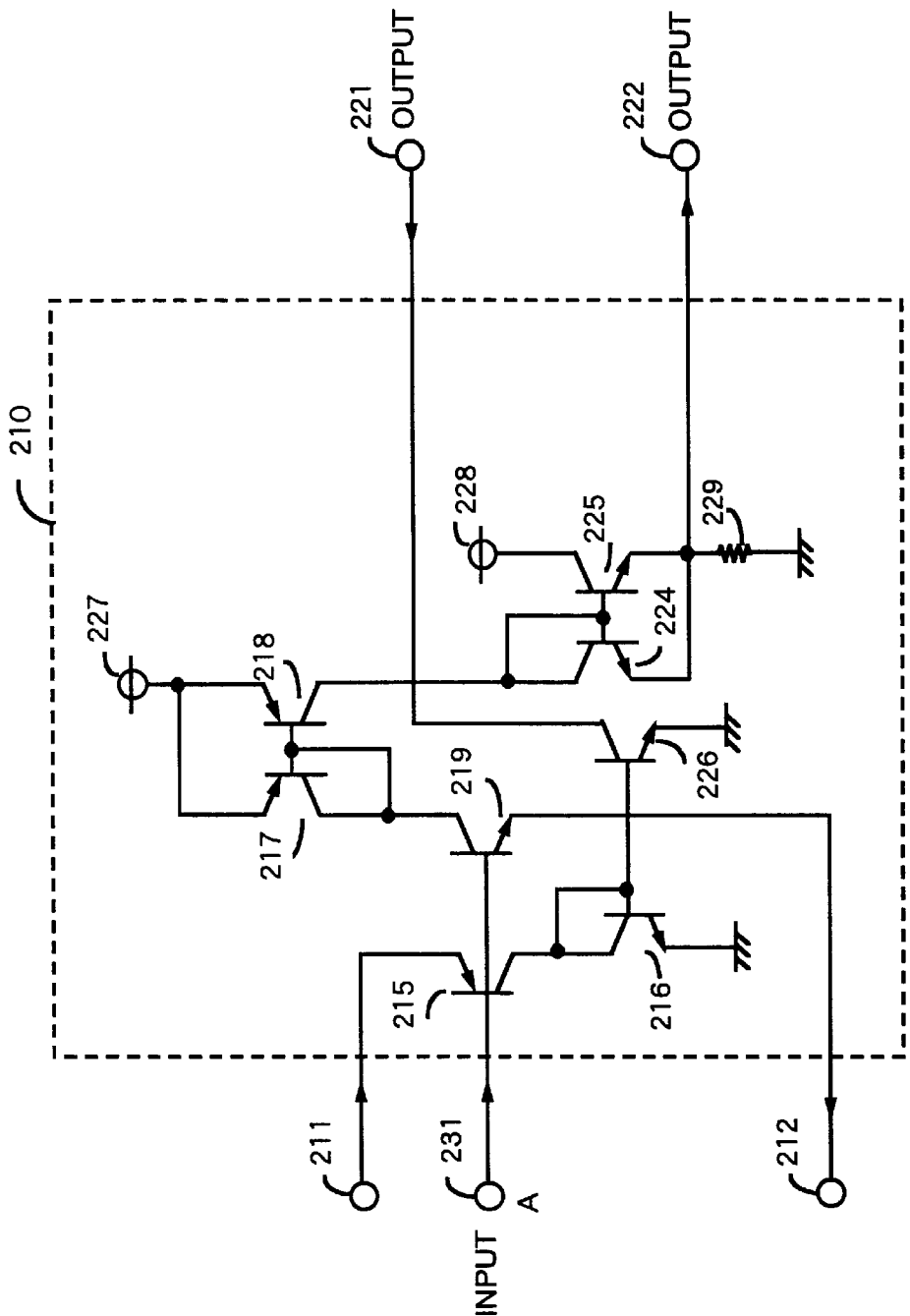
FIG. 4 shows a detailed circuit of a buffer used in the first and second embodiments of the present invention.

The construction and the operation of the buffer circuit 200 shown in FIG. 4 is described below. The buffer circuit 200 comprises a U-phase buffer 210, a W-phase buffer 220, and a V-phase buffer 230. The buffer circuit 200 is controlled for every phase, therefore, only the U-phase buffer circuit 210 is described below using FIG. 4. In FIG. 4, the U-phase buffer circuit 210 includes an input terminal 231 where an output signal A is input from a commutation switching circuit 650, a first control signal input terminal 211 connected to an output terminal 941 in the neutral feedback amplifier 900 and a second control signal input terminal 212 connected to an output terminal 942 in the neutral feedback amplifier 900. The U-phase buffer circuit 210 further comprises transistors 215–219, 224–226, power sources 227 and 228, and output terminals 221 and 222. The transistors 216 and 226, the transistors 217 and 218, the transistors 224 and 225 are current-mirror connected, respectively.

The first control signal input terminal 211 is connected to the collector of the transistor 215 and the second control signal input terminal 212 is connected to the emitter of the transistor 219. The input terminal 231 is connected to the base of the transistor 215, and the collector of the transistor 215 is connected to the collector and the base of the transistor 216. The collector of the transistor 226, current-mirror connected to the transistor 216, is connected to the output terminal 221. The base of the transistor 219 is connected to the input terminal 231 and its collector is connected to the collector of the transistor 217 current-mirror connected to the transistor 218. Each emitter of transistors 217 and 218 which are current-mirror connected, is connected to the power source 227. The collector of the transistor 218 is connected to a collector of the transistor 224, current-mirror connected to the transistor 225. The collector of the current-mirror connected transistor 225 is connected to the power source 228. Each emitter of the transistors 224 and 225, which are current-mirror connected, is connected to the output terminal 222 and also grounded via the resistor 229.

The operation of the buffer 210 is described. The output signal A is input to the base of the transistor 215 in the buffer 210 via the terminal 231 from the commutation switching circuit 650. The collector of the transistor 902 in the neutral feedback amplifier 900 is connected to the emitter of the transistor 215 via the terminal 941 and the terminal 211. The collector of the transistor 910 is connected to the emitter of the transistor 219 via the terminal 942 and the terminal 212. When the input signal A becomes high, the transistor 215 turns on and current flows through the transistor 216. The transistor 216 causes a current to flow to the current-mirror connected transistor 226. The transistor 226 pulls a current from the driving transistor 101 in the motor driving transistor circuit 100 in FIG. 1 via the terminal 221. The current flows through the driving transistor 101 and supplies the driving voltage to the U-phase winding in the motor 10 to rotate the motor.

When the current of the transistor 902 in the neutral feedback amplifier 900 increases, the current is supplied to the transistor 215 via the terminal 941 and the terminal 211 to increase the output current at the terminal 221. When the current of the transistor 902 in the neutral feedback amplifier 900 decreases, the current of the transistor 215 is decreased via the terminal 941 and the terminal 211 to decrease the output current of the terminal 221.

When the current from the terminal 942 in the neutral feedback amplifier 900 increases, the current of the transistor 217 increases via the transistor 219, and the current of the current-mirror connected transistor 218 also increases. When the current from the terminal 942 in the neutral feedback amplifier 900 decreases, the current of the transistor 217 decreases via the transistor 219, and the current of the current-mirror connected transistor 218 decreases. When the current of the transistor 218 increases, the current of the transistor 224 increases, therefore, the current of the current-mirror connected transistor 225 increases. As a result, the current of the transistor 225 increases, and a current supplied from the terminal 222 also increases. As described above, the buffer 210 supplies current to the transistor 104 in the motor driving transistor circuit 100 in FIG. 1 via the terminal 222. The current flowing through the driving transistor 104 supplies the driving voltage to the U-phase winding in the motor 10 to rotate the rotor.

The basic currents are supplied from the terminal 221 and the terminal 222 according to the signal A input to the terminal 231, but the basic currents of the terminal 221 and the terminal 222 are precisely controlled by the currents supplied from the terminal 211 and the terminal 212. In other words, the current supplied from the terminal 222 is increased or decreased by the increase and decrease of the current supplied to the terminal 211, and the current supplied to the terminal 222 is increased or decreased by the increase and decrease of the current supplied to the terminal 212. In this way, the present invention has an important feature in that the current of the driving transistors 101–106 is precisely controlled so that the terminal voltages U, V, and W of the motor 10 are also precisely controlled to fix the neutral voltage of the motor 10.

Figure 3:
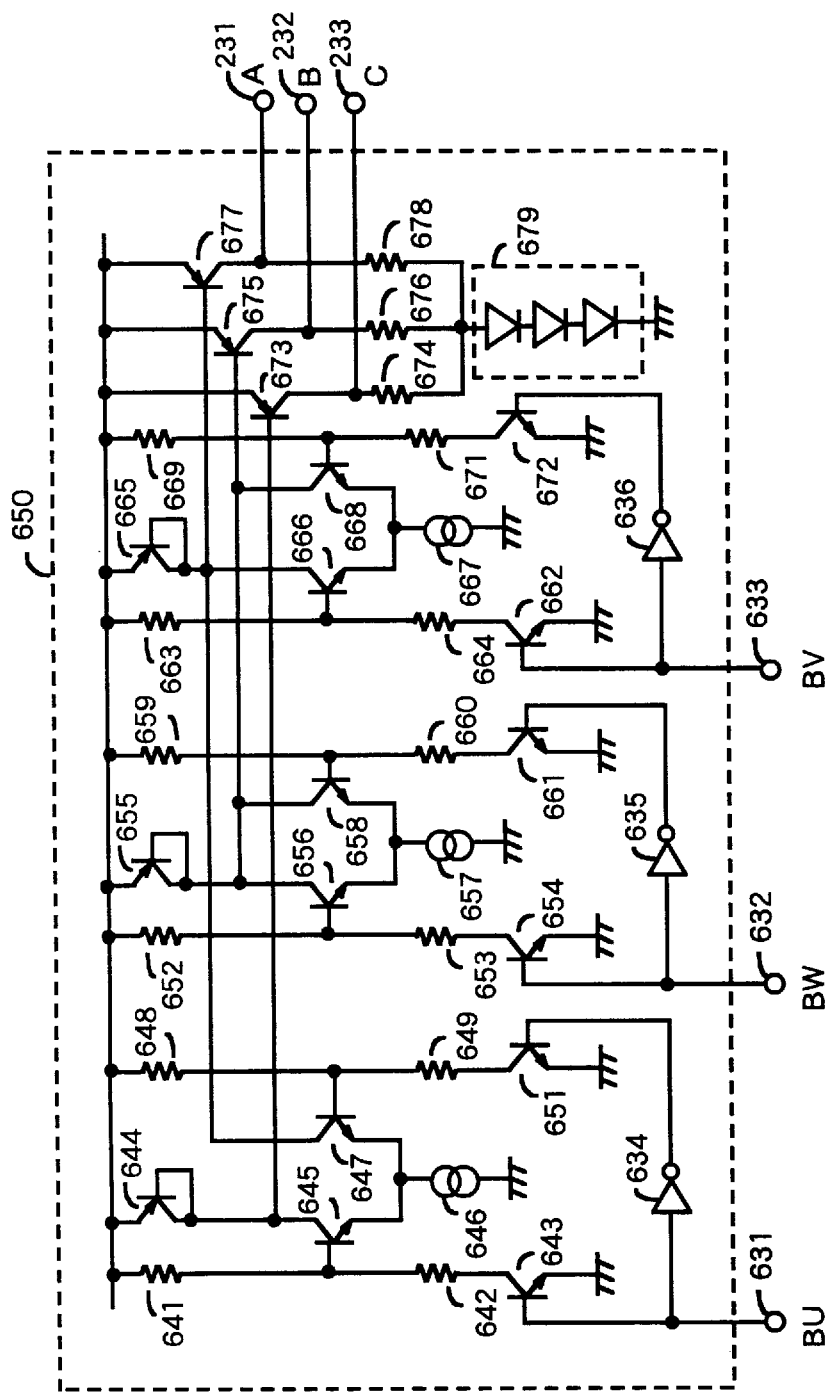
FIG. 3 shows a detailed commutation switching circuit of the first embodiment of the present invention.

FIG. 3 shows a detail of a commutation switching circuit 650. The commutation switching circuit 650 receives the BU, BW and BV signals from a position detecting circuit 500 to output signals A, B, and C. Although FIG. 3 includes respective circuits for the U, W, and V-phases, only the U-phase is explained below, since the circuits and the operations of the U, W, and V- phases are the same. A position signal BU input to a U-phase terminal 631 is applied directly to a base of a transistor 643 and is applied to a base of a transistor 651 via an inverter 634.

When the position signal BU becomes logic "H", the transistor 643 turns on and the transistor 651 turns off. When the transistor 643 turns on, the voltage that is divided by resistors 641 and 642 having a predetermined division ratio is applied to the base of the transistor 645, then the transistor 645 turns off. On the other hand, when the transistor 651 turns off, the source voltage is applied to the base of a transistor 647, which forms a differential amplifier with the transistor 645, so the transistor 647 turns on. The collector of the transistor 647 pulls current from the base of a transistor 677. The transistor 677 turns on and the collector voltage of the transistor 677 is supplied to the buffer circuit 200 of the next stage as an output voltage A from the terminal 231.

On the other hand, when the position signal BU turns logic "L", the transistor 643 turns off and the transistor 651 turns on. When the transistor 643 turns off, the source voltage is applied to the base of the transistor 645 forming the differential amplifier, so the transistor 645 turns on.

When the transistor 645 turns on, the constant current selected by a constant source 646 flows through the transistor 644, and a current-mirror connected transistor 673. When the current flows through the transistor 673, the collector voltage of the transistor 673 is supplied to the buffer circuit 200, in the next stage, as an output voltage C from the terminal 233.

Figure 5A:
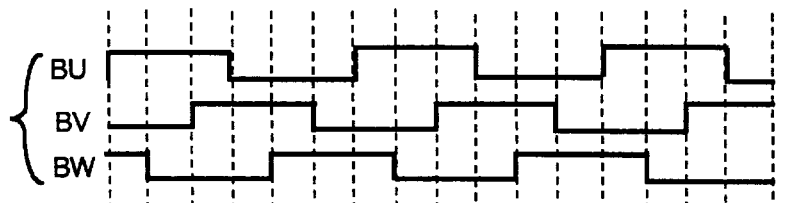
Figure 5B:
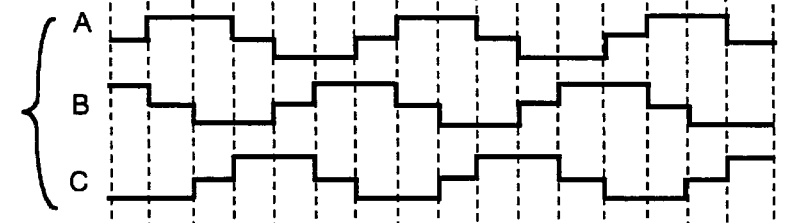

In case of the position signals BV and BW, the voltage is supplied from the terminals 231, 232, and 233. For example, the terminal 231 is connected to the transistor 677, and the transistor 677 is connected to the transistors 647 and 666, so the currents of the transistor 647 and the transistor 666 are synthesized to supply the current to the terminal 231. Accordingly, the current flowing through the transistor 677 is controlled in three categories, namely, when no current is supplied to the base of the transistor 677 from the transistor 647 and the transistor 666, when the base current is supplied from either the transistor 647 or the transistor 666, and when the base current is supplied from both of the transistor 647 and the transistor 666 . Accordingly, the voltage supplied to the terminal 231 may have any of three values. The voltage supplied to the terminals 232 and 233 also has three values. The voltage generated in the terminals 231, 232, and 233 in this way is shown in FIG. 5B. The voltages A, B, and C with the waveforms as shown in FIG. 5B are applied to the buffer circuit 200 in the next stage.

Figure 5C:
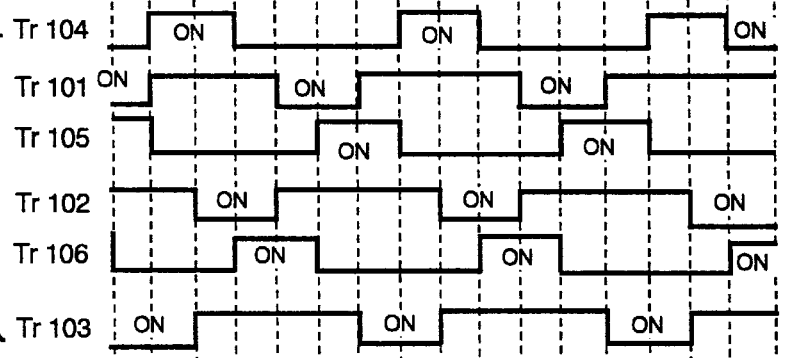

As stated above, when the voltages A, B, and C, with the waveforms as shown in FIG. 5B, are applied to the buffer circuit 200, the buffer 210 in FIG. 4 outputs the driving signals shown in FIG. 5C for each phase, which are applied to the transistors 101–106 to drive the motor 10. A detailed description of the operation of the buffer 210 is omitted since that description has been given for FIG. 4.

As stated above, in the present invention, the neutral feedback amplifier 900 detects each terminal voltages of the motor 10. The buffers 210–230 in the buffer circuit 200 lowers the neutral potential when the terminal voltage rises, and raises the neutral potential when the terminal voltage drops, so that the neutral potential is kept constant. As a result, the neutral potential does not change, even when the feeding current to the motor 10 is small as shown in FIG. 7A and even when the feeding current to the motor 10 is large as shown in FIG. 7B. The amplitude of the terminal voltage only expands in both sides around the neutral potential. Accordingly, there is no need to use the conventional terminal voltage correcting circuit 400 since the position of the rotor 10 is accurately indicated by the voltage waveform.

Embodiment 2

Figure 8:
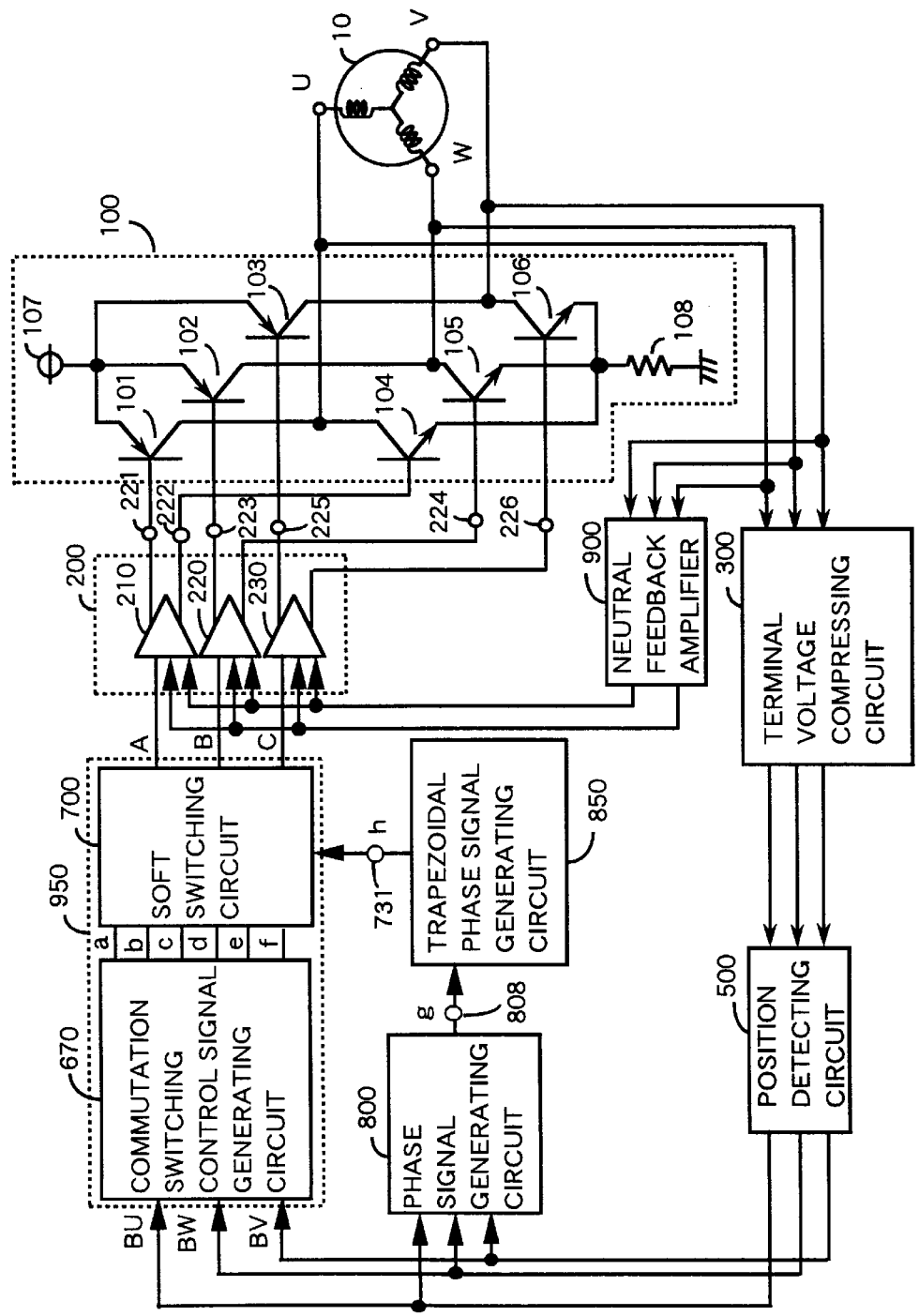
FIG. 8 shows a driving circuit of a second embodiment of the present invention.
Figure 9:
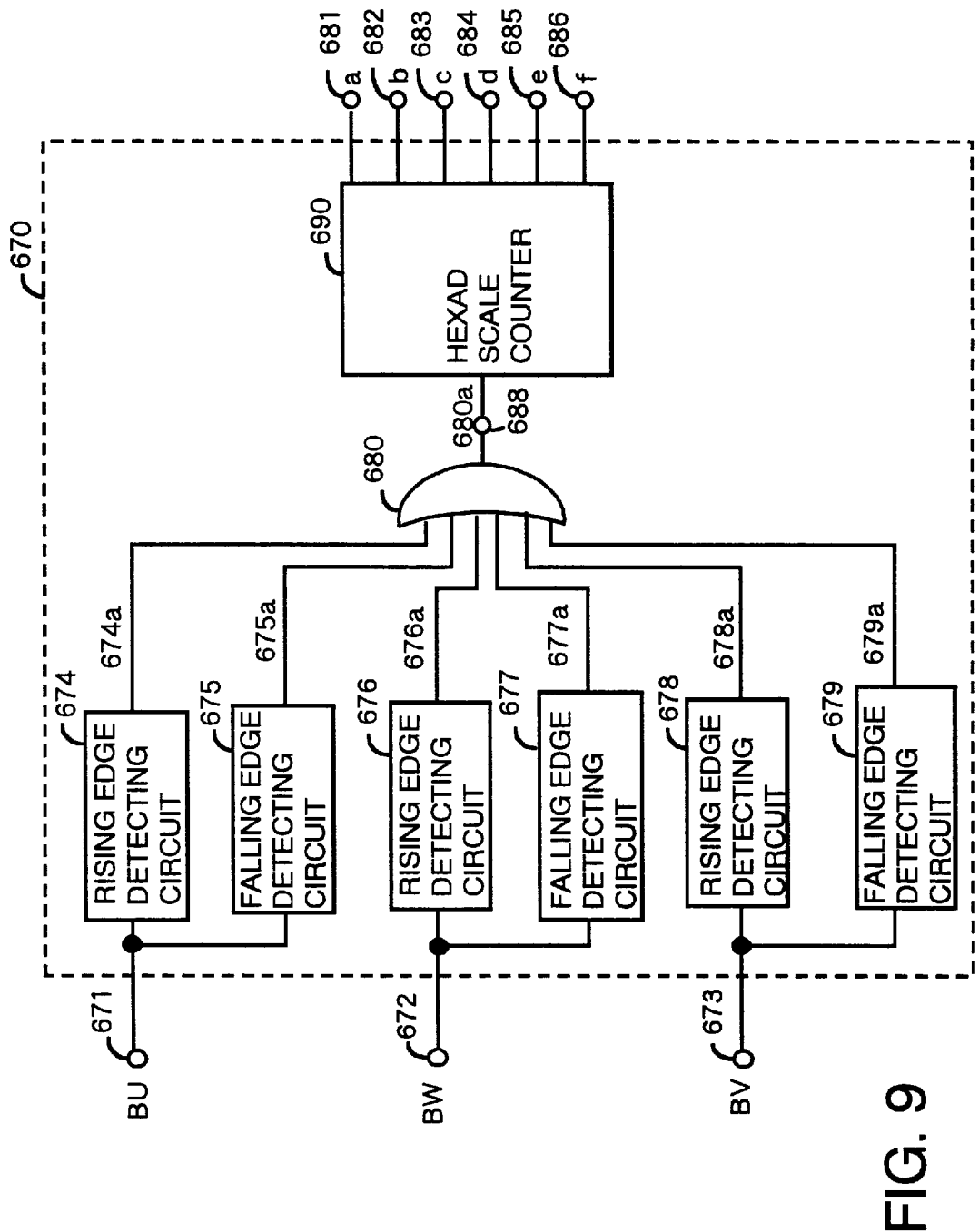
FIG. 9 shows a detailed commutation switching control signal generating circuit of the second embodiment of the present invention.
Figure 10:
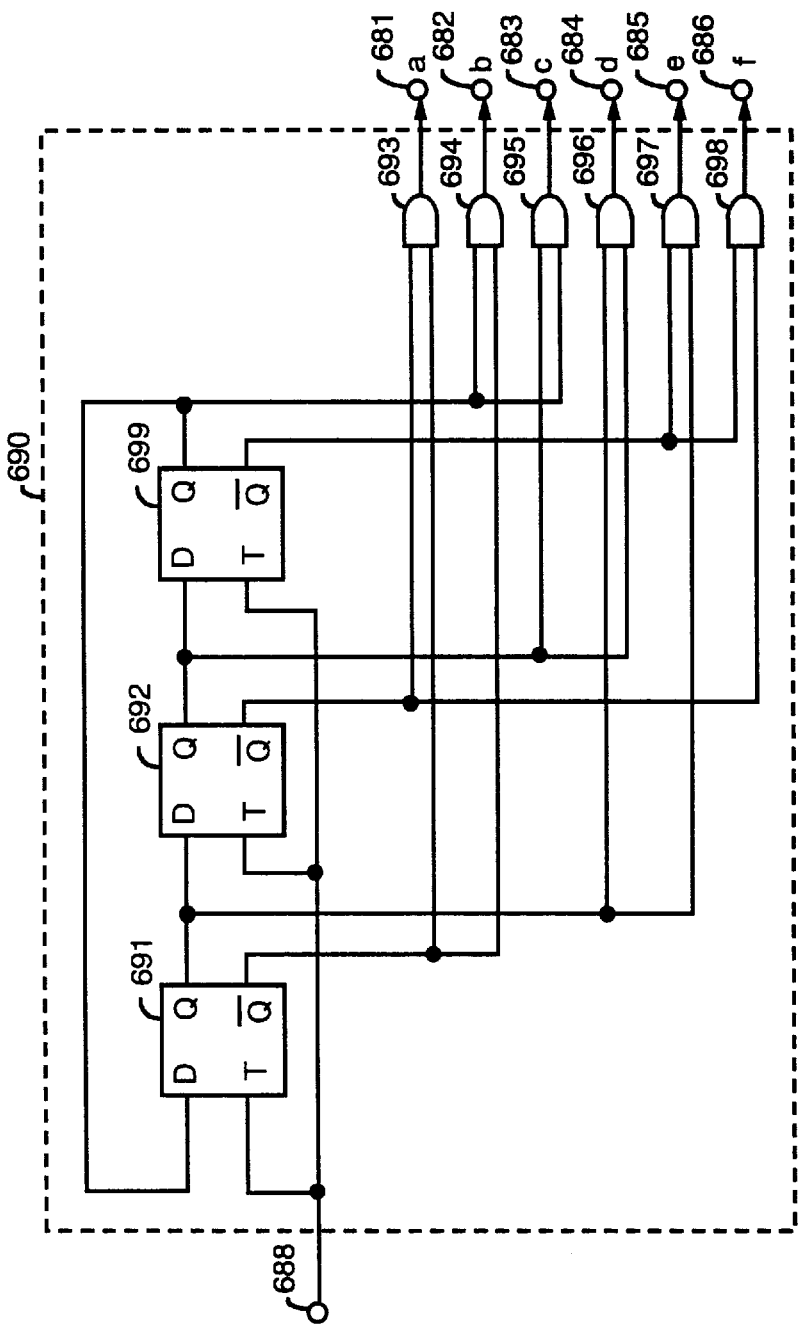
FIG. 10 shows a detailed hexad counter of the commutation switching control signal generating circuit of the second embodiment of the present invention.
Figure 11:
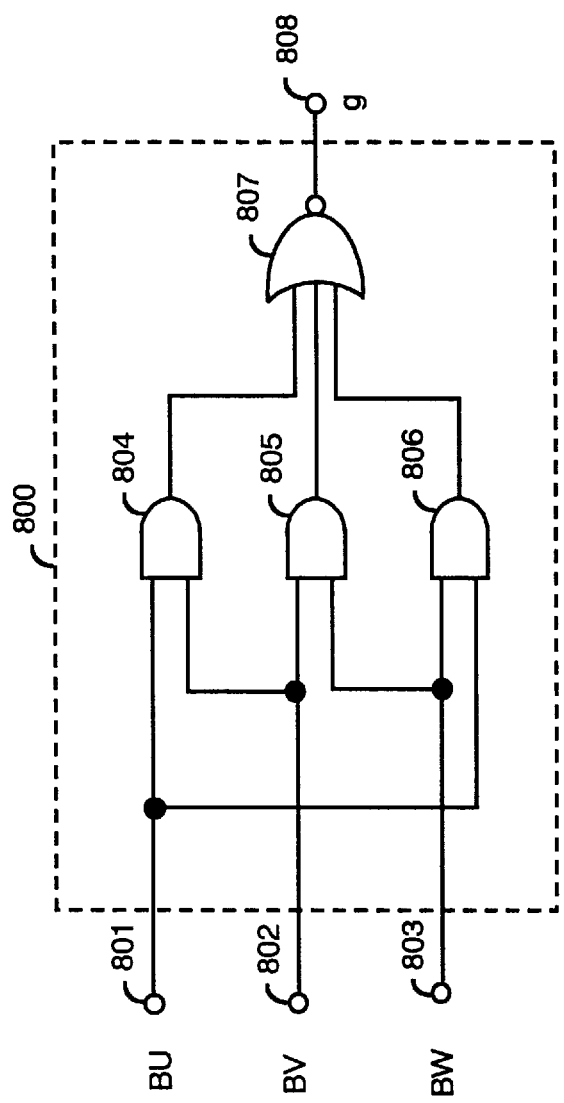
FIG. 11 shows a detailed phase signal generating circuit of the second embodiment of the present invention.
Figure 13:
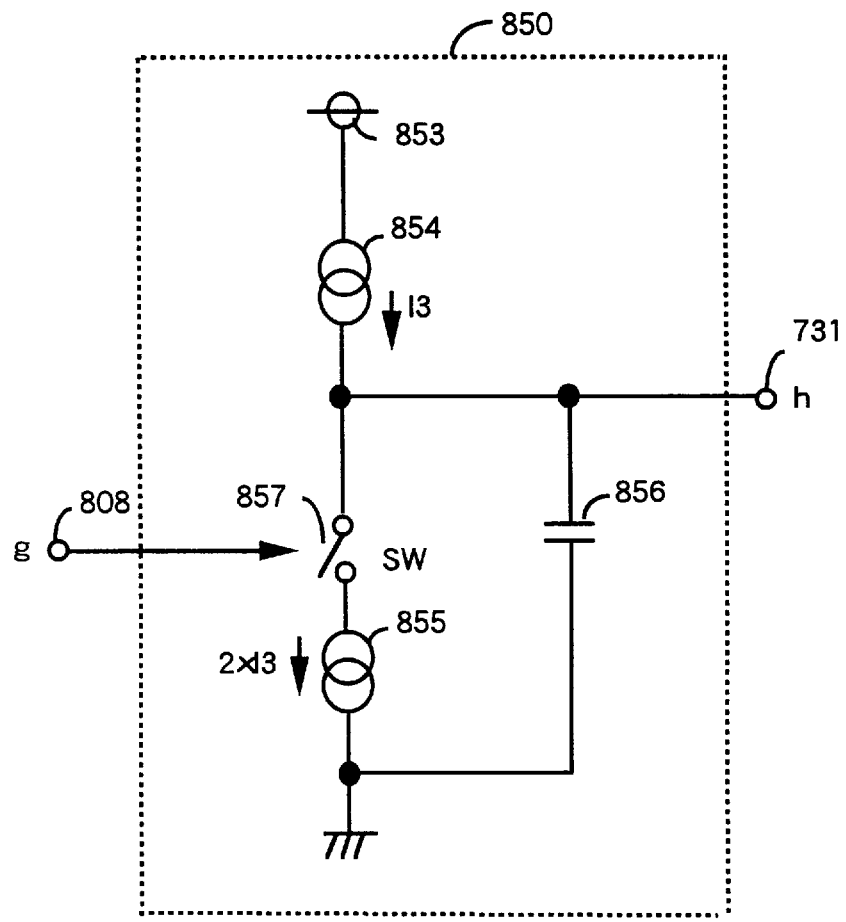
FIG. 13 shows a detailed trapezoidal phase signal generating circuit of the second embodiment of the present invention.
Figure 14:
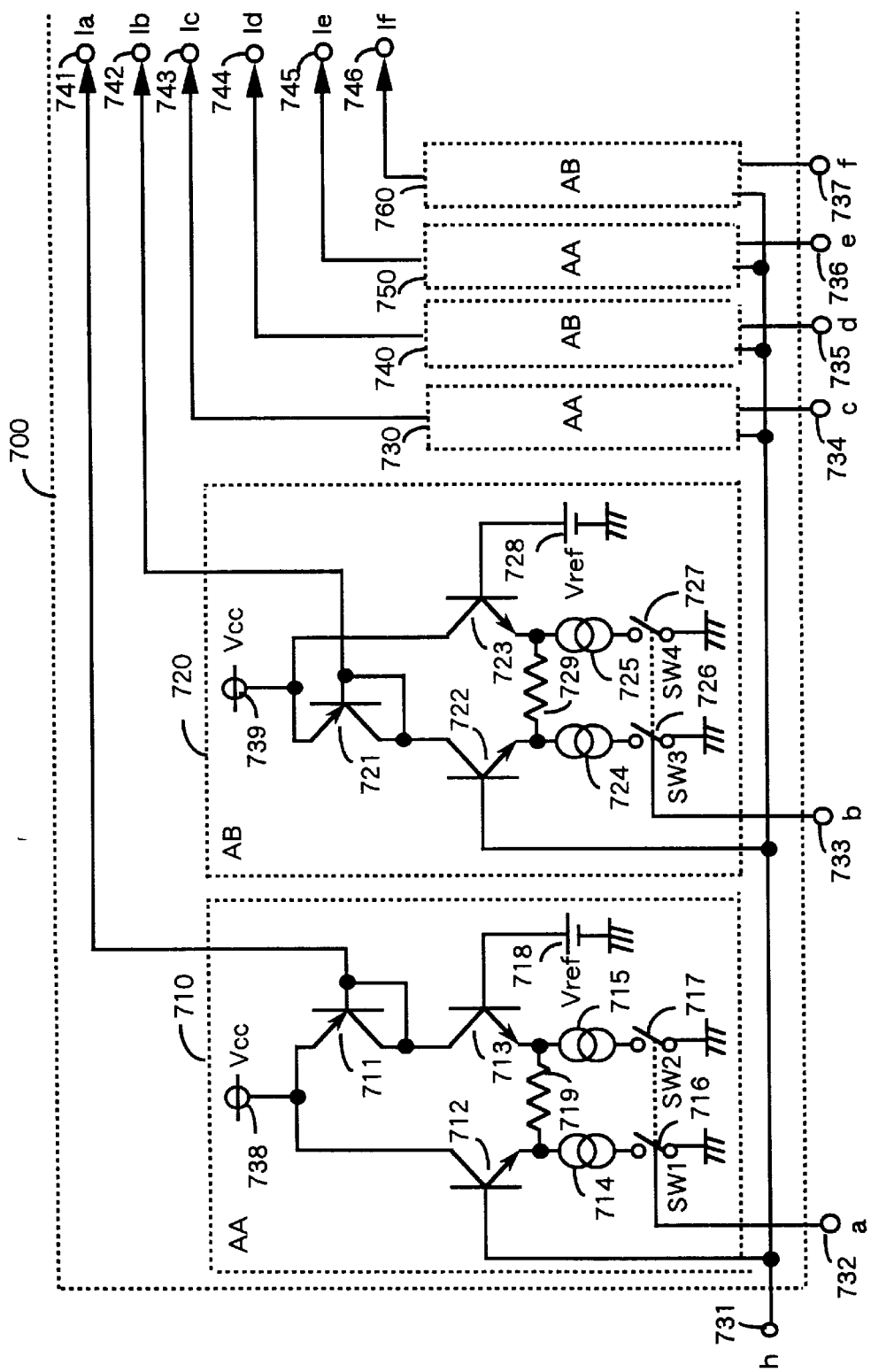
FIG. 14 shows a detailed soft switching circuit of the second embodiment of the present invention.
Figure 15:
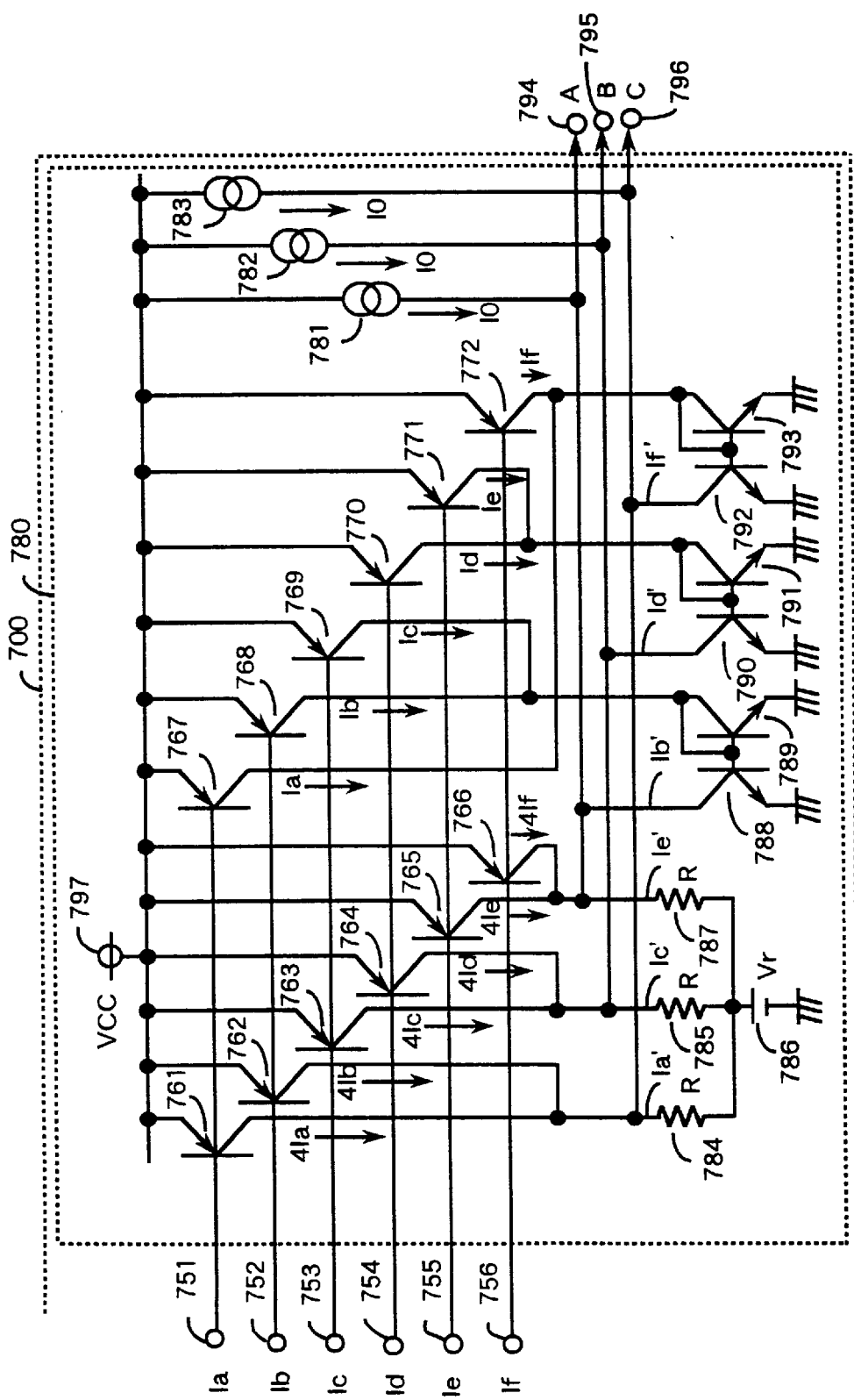
FIG. 15 shows a detailed soft switching circuit of the second embodiment of the present invention.

A circuit according to a second embodiment is shown in FIG. 8 and comprises a soft switching circuit 700, a phase signal generating circuit 800, and a trapezoidal phase signal generating circuit 850 in addition to the circuit elements of the first embodiment. A commutation switching control signal generating circuit 670 provides signals a–f to the soft switching circuit 700 to generate signals A, B, and C. FIG. 9 shows the detailed circuit of the commutation switching control signal generating circuit 670, FIG. 10 shows a hexad counter 690 in the commutation switching control signal generating circuit 670, FIG. 11 shows a detailed phase signal generating circuit 800, FIG. 13 shows a detailed trapezoid phase signal generating circuit 850, and FIG. 14 and FIG. 15 show the detailed soft switching circuit 700. Description of the other elements is omitted since they have been described for the first embodiment. FIGS. 16A–16J are timing charts for the operation of the circuit of the second embodiment. FIG. 17 shows a terminal voltage waveform at the motor 10 in the second embodiment of the invention.

The operation of the circuit of the second embodiment is described below. In FIG. 8, the position detecting circuit 500 outputs BU, BV, and BW output signals. Receiving the signals BU, BV, and BW from the position detecting circuit 500, the commutation switching control signal generating circuit 670 generates commutation switching control signals a–f. Receiving the signals a–f from the commutation switching control signal generating circuit 670, the soft switching circuit 700 generates signals A, B, and C. Receiving the signals BU, BV, and BW from the position detecting circuit 500, the phase signal generating circuit 800 generates a phase signal g. Receiving the phase signal g from the phase signal generating circuit 800, the trapezoid phase signal generating circuit 850 generates a trapezoidal phase signal h to be supplied to an input terminal 731 of the soft switching circuit 700.

The detailed circuit of the commutation switching control signal generating circuit 670 is described below using FIG. 9. In FIG. 9, the position signals BU, BW, and BV are respectively input to rising edge detection circuits 674, 676, and 678 and falling edge detecting circuits 675, 677, and 679. Rising edge pulses 674a, 676a, and 678a are output from the rising edge detection circuits 674, 676, and 678. Falling edge pulses 675a, 677a, and 679a are output from the falling edge detecting circuits 675, 677, and 679. Detected edge pulses 674a, 676a, 678a, 675a, 667a, and 679a are input to an OR circuit 680. The OR circuit 680 outputs a pulse at each rising edge and each falling edge of the position signals.

FIG. 10 shows the detailed hexad counter 690 in the commutation switching control signal generating circuit 670 of the second embodiment of the present invention. Receiving the rising pulses and the falling pulses from the OR circuit 680, the hexad counter 690 outputs the commutation switching control signals a, b, c, d, e and, as shown FIG. 16C, via D flip flops 691, 692, and 699 and AND gates 693–698 shown in FIG. 10.

Figure 12:
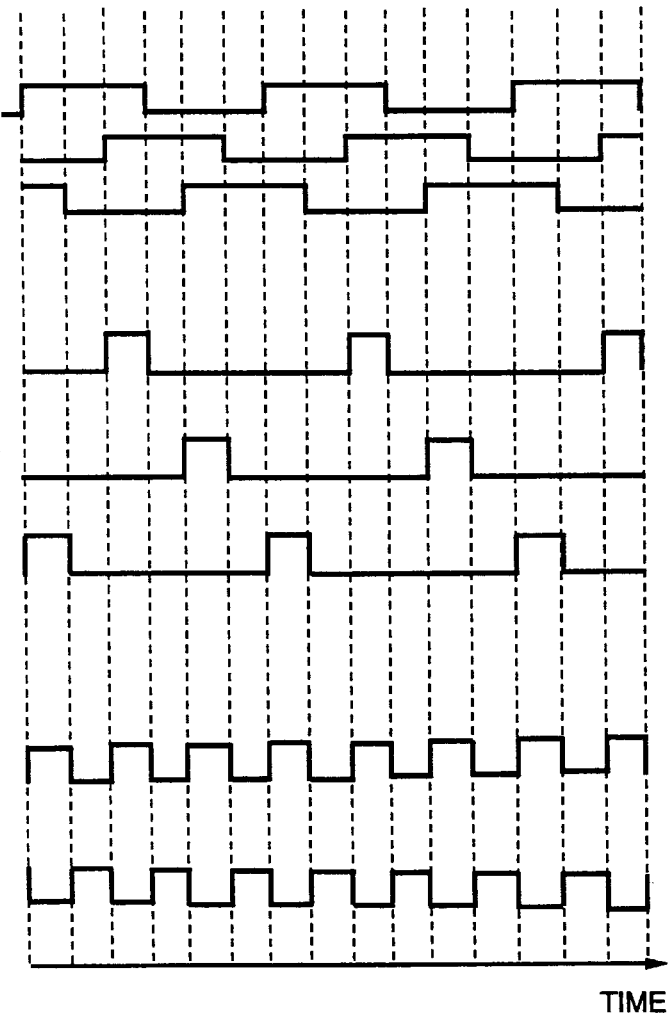
FIGS. 12A–12D are timing charts showing the operation of the phase signal generating circuit of the second embodiment of the present invention.

FIG. 11 shows a detailed circuit of the phase signal generating circuit 800. In FIG. 11, the phase signal generating circuit 800 comprises input terminals 801–803 for the position signals BU, BW, and BV, AND circuits 804–806, a NOR circuit 807 and an output terminal 808 for the trapezoid phase signal g. FIGS. 12A–12D show timing charts for the operation of the phase signal generating circuit 800. The position signals BU, BW, and BV input to the terminals 801–803 (FIG. 12A) are used in calculations, such as BU×BV, BV×BW and BW×BU, respectively, in the AND circuits 804–806 (FIG. 12B). The signals resulting from these calculations are input to the NOR circuit 807 and, finally, the phase signal g is obtained as a repeated waveform of logic "H" and logic "L" (FIGS. 12D and FIG. 16B).

The phase signal g generated by the phase signal generating circuit 800 is input to the trapezoidal phase signal generating circuit 850. A trapezoidal phase signal h is generated in the trapezoidal phase signal generating circuit 850. The trapezoidal phase signal generating circuit 850 shown in FIG. 13 comprises an input signal terminal 808, a switch (SW) 857, a capacitor 856, constant current sources 854 and 855, a power supply 853, and an output terminal 731. When the phase signal g input to the input terminal 808 changes from logic "L" to logic "H", the switch (SW) 857 is opened and the capacitor 856 starts to be charged. After the time t, the capacitor is charged to Vcc by the current I3 from the constant current source 854. The voltage of the output terminal 731 rises as shown by the trapezoidal phase signal h in FIG. 16D. The charging stops when the charged voltage becomes equal to the supply voltage, and, therefore, the voltage across the capacitor 956 is kept constant. In the meantime, when the phase signal g changes from logic "H" to logic "L", the switch (SW) 857 closes. Accordingly, the capacitor 856 is discharged by the constant current source 855 having the current 2×I3. After the time t, the terminal voltage of the output terminal 731 becomes 0 as shown by the trapezoidal phase signal h in FIG. 16D.

Figure 16:
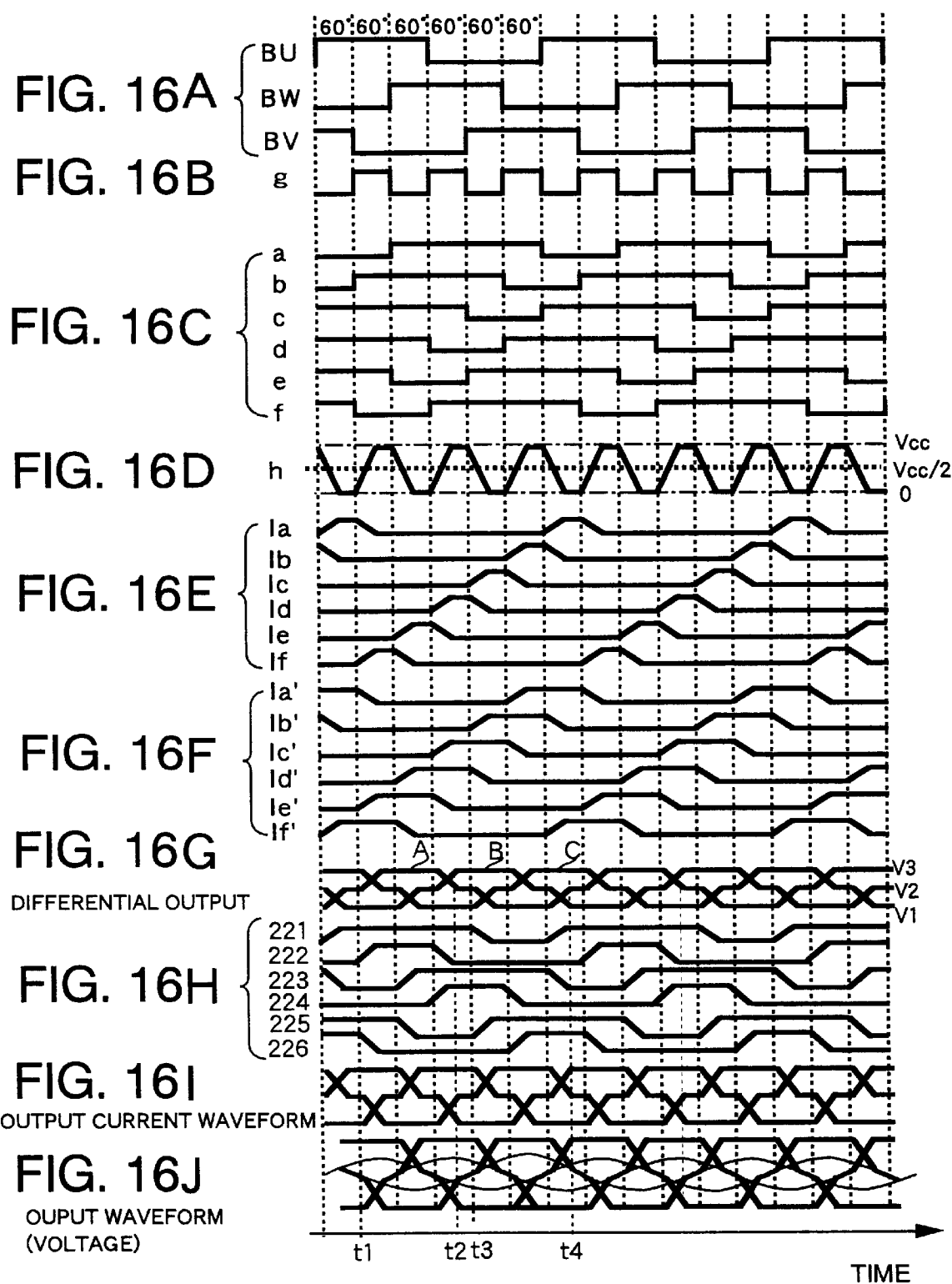
FIGS. 16A–16J are timing charts showing the operation of the second embodiment of the present invention.
Figure 17:
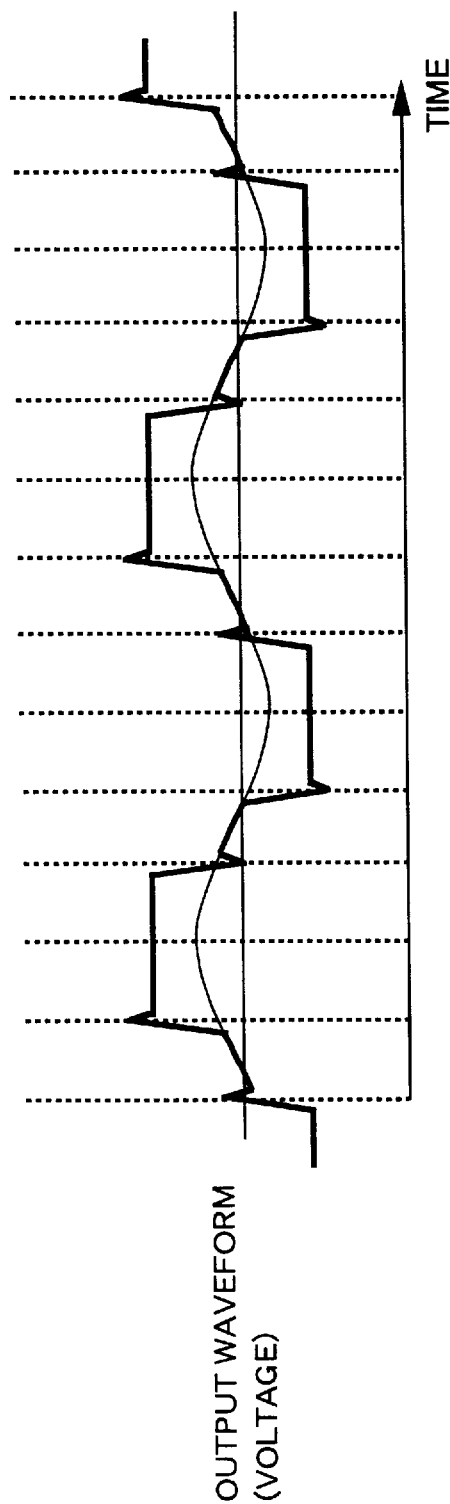
FIG. 17 shows a terminal voltage waveform of the motor of the second embodiment of the present invention.

In this way, the trapezoidal phase signal h has a waveform having a slope as shown by the trapezoidal phase signal h in FIG. 16D. The switch SW closes when the phase signal g is low and opens when the phase signal g is high.

Commutation switching control signals a–f generated by the commutation switching control signal generating circuit 670 are input to the soft switching circuit 700 shown in FIG. 14 and FIG. 15. Receiving output signals a–f from the commutation switching control signal generating circuit 670, the soft switching circuit 700 outputs the signals A, B, and C, as shown in FIG. 15, by closing and opening the switches (SW1–SW4) in circuits AA and AB shown in FIG. 14. The switches SW1–SW4 close when the signals a–f are low and open when the signals a–f are high.

The soft switching circuit 700 is comprised of two circuits shown in detail in FIG. 14 and FIG. 15. Six circuits 710, 720, 730, 740, 750, and 760 of FIG. 14 generate current components Ia–If according to the signals a–f, respectively, received from the commutation switching control signal generating circuit 670. The current components Ia–If are output to the circuit of FIG. 15 to generate the output signals A, B, and C. The construction and the operation of the soft switching circuit 700 are explained using FIG. 14 and FIG. 15.

In FIG. 14, circuits 730 and 750 are the same circuit as the circuit 710 indicated by AA. Circuits 740 and 760 are the same as the circuit 720 indicated by AB. An input commutation switching control signal a is input to the circuit 710 to output the output current Ia. The input commutation switching control signal b is input to the circuit 720 to output the output current Ib. Similarly, the circuits 730 and 750 are supplied with commutation switching control signals c and e respectively to output the output currents Ic and Ie. Commutation switching control signals d and f are input to the circuits 740 and 760 respectively to output the outputs current Id and If. Since the circuits 730 and 750 for processing the commutation switching control signals c and e and the circuits 740 and 760 for processing the commutation switching control signals d and f are the same as the circuit 710 and the circuit 720 respectively, no description of them is needed.

The circuit 710 in the soft switching circuit 700 of FIG. 14 is described below. The circuit 710 comprises an input terminal 732 where the commutation switching control signal a is input, differential transistors 712 and 713, constant current sources 714 and 715, switches (SW1, SW2) 716 and 717, a reference voltage source 718, and a transistor 711 current-mirrored with the transistor in FIG. 15. The circuit 710 further comprises an input terminal 731, where the trapezoidal phase signal h generated in the trapezoidal phase signal generating circuit 850 is input, and a source 738.

When the commutation switching control signal a is logic "L", the switches 716 and 717 are closed, so that the AA type circuit 710 turns on. The AA type circuit 710 compares the constant voltage of the reference voltage 718 with the voltage of the trapezoidal phase signal h input to the terminal 731, and supplies the differential current flowing through a resistor 719. The AA type circuit 710 outputs the current Ia from the current-mirror connected transistor 711 as shown in FIG. 16E. In other words, when the trapezoidal phase signal h input to the terminal 731 is logic "H", since the voltage of the trapezoidal phase signal h is higher than the voltage of the reference voltage 718, the differential transistor 712 turns on and the differential transistor 713 turns off. Accordingly, the emitter voltage of the transistor 711 is an inversion of the trapezoidal phase signal h and is output as a current Ia.

The circuit 720 comprises an input terminal 733 where the commutation switching control signal b is input, differential transistors 722 and 723, constant current sources 724 and 725, switches (SW3, SW4) 726 and 727, a reference voltage source 728, and a transistor 721 current-mirrored with the transistor in FIG. 15. The circuit 720 further comprises an input terminal 731 where the trapezoidal phase signal h, generated in the trapezoidal phase signal generating circuit 850, is input and a source 739.

When the commutation switching control signal b is logic "L", the switches 726 and 727 close and the AB type circuit 720 turns on. The AB type circuit 720 compares the constant voltage of the reference voltage 728 with the trapezoidal phase signal h input to the terminal 731, and gives the differential current flowing through a resistor 729. The AB type circuit 720 outputs the current Ib from the current-mirror connected transistor 721 as shown in FIG. 16E. In other words, when the trapezoidal phase signal h input to the terminal 731 is logic "H", since the voltage of the trapezoidal phase signal h is higher than the voltage of the reference voltage 728, the differential transistor 722 turns on and the differential transistor 723 turns off. Accordingly, the emitter voltage of the transistor 721 is shown as an inversion of the trapezoidal phase signal h and is output as a current Ib.

Similarly, when the commutation switching control signal c is logic "L", the current Ic is output, when the commutation switching control signal d is logic "L", the current Id is output, when the commutation switching control signal e is logic "L", the current Ie is output, and when the commutation switching control signal f is logic "L", the current If is output. The signals which are generated in this way are shown in FIGS. 16A–16J as the currents Ia–If.

The currents Ia–If are input to the terminals 751–756 of the soft switching circuit shown in FIG. 15, respectively. The soft switching circuit 700 of FIG. 15 receives the output currents Ia–If and outputs the differential outputs A, B, and C shown in FIGS. 16A–16J. In FIG. 15, soft switching circuit 700 comprises input terminals 751–758, and transistors 761–766 and 767–772 which form current-mirror circuits with the transistors 711, 721 . . . in FIG. 14. The transistors 788 and 789, 790 and 791, 792 and 793 form current-mirror circuits, respectively. The soft switching circuit 700 further comprises resistors 784, 785, and 787 that convert the current into a voltage, a constant voltage 786, constant current sources 781, 782, and 783 and output terminals 794, 795, and 796 for outputting signals A, B, and C, respectively.

A commutation switching signal generating circuit 780 in the soft switching circuit 700 of FIG. 15 outputs the signals A, B, and C. Since the generation of the signals B and C is similar to the generation of the signal A, only the generation of the voltage signal A at the terminal 794 is explained below for the time t1 to t4 shown in FIGS. 16A–16J.

During the time t1 to t2, the currents Ie and If, which are input to the terminals 755 and 756, flow through the transistors 765 and 766, respectively. These two currents are summed and flow to the resistor 787. The transistors 761–766 are current-mirror connected to the transistors 711, 712 . . . shown in FIG. 14. Since the current-mirror ratio is set to "4", the currents flowing through the transistors 765 and 766 are 4Ie and 4If, respectively. Accordingly, the current summed by the transistors 765 and 766 is 4 (Ie+If). In the meantime, the constant current I0 flowing through the current source 781 also flows through the resistor 787. Total current Ie' flowing through the resistor 787 is 4 (Ie+If)+I0. The voltage output to the terminal 794 is Ie'×R+Vr. If the larger of the currents Ie and If is selected as "I" and the value of the constant current I0 is selected as "8I", the maximum current Ie" flowing through the resistor 787 is Ie"=4 (I+I)+ 8I=16I. Accordingly, the maximum voltage V3 which is output to the terminal 794 is V3=Ie"×R+Vr=16IR+Vr, where R denotes each resistance of the resistors 784–787.

The generation process of the voltage signal A at the terminal 794 during the time t2 to t3 is described below. During this period, only the current Id flows and turns on the transistors 764 and 770. However, since the current does not flow through the resistor 787, the voltage of the terminal 794 is not influenced. In the meantime, the constant current I0 supplied from the constant current source 781 flows through the resistor 787 and generates the voltage drop 10×R. Accordingly, the voltage at the terminal 794 is I0×R+Vr. If the constant current I0 is 8I, the voltage signal A at the terminal 794 is 8IR+Vr. If the voltage Vr is small, the voltage is approximately half of the maximum voltage.

The generation of the voltage signal A at the terminal 794 during the time t3 to t4 is described below. During this period, the currents Ib and Ic are input to the terminals 752 and 753 and flow through the transistors 762 and 763, respectively. However, since these currents do not flow through the resistor 787, the voltage signal A at the terminal 794 is not influenced. In the meantime, the currents from the transistors 768 and 769 are summed and the summed current flows through the transistor 789. Since the transistor 788 is current-mirror connected to the transistor 789 with a current-mirror ratio of 4, the transistor 788 pulls a current from the resistor 787 four times the current flowing through the transistor 789. The current I0 from the constant source 781 flows through the resistor 787. Accordingly, the current Ie' flowing through the resistor 787 is obtained as Ie'={I0−4 (Ib+Ic)}. The output voltage A of the first terminal 794 is obtained as A={I0−4 (Ib+Ic)}R+Vr. If the maximum current I0 is 8I and the maximum currents Ib and Ic are I, the current Ie' is obtained as Ie'=8I−8I+Vr=Vr, and the output voltage A at the first terminal 794 is obtained as A=8I−8I+Vr=Vr. Accordingly, when the voltage Vr is small, the voltage A at the terminal 794 in this period is approximately 0V.

The voltage signals A, B, and C are applied in this way and are added to the driving transistor circuits 101–106 in the motor driving transistor circuit 100. The currents flowing through the driving transistors are supplied to and drive the motor 10. The output current waveform and the output voltage waveform at this time are shown in FIGS. 16I and 16J. This waveform is an ideal form and the real output waveform has some spikes as observed in FIG. 17. However, these spike voltages are very small compared to the conventional spike voltages and are so reduced as to provide little sound.

What is claimed is:

1. A sensorless brushless motor driving circuit for controlling driving of a motor based on a motor driving current comprising:

a position detecting circuit for detecting position of a rotor of the motor from terminal voltages of the motor and generating a position signal;

a commutation switching circuit for generating commutation switching signals based on the position signal;

a motor driving transistor circuit for supplying motor driving currents to the motor in response to driving signals;

a buffer circuit for supplying the driving signals to drive the motor in response to the commutation switching signals from the commutation switching circuit; and a neutral feedback amplifier for detecting a neutral potential of the terminal voltages of the motor, comparing the neutral potential with a reference voltage, outputting a first output to the buffer circuit when the neutral potential is higher than the reference voltage, and outputting a second output to the buffer circuit when the neutral potential is lower than the reference voltage wherein the buffer circuit lowers the neutral potential when the neutral potential is higher than the reference voltage, and raises the neutral potential when the neutral potential is lower than the reference voltage.

2. A sensorless brushless motor driving circuit for controlling driving of a motor based on a motor driving current comprising:

a position detecting circuit for detecting a position of a rotor of the motor from terminal voltages of the motor;

a motor driving transistor circuit for supplying motor driving currents to the motor in response to driving signals;

a buffer circuit for supplying the driving signals to drive the motor in response to communication switching signals;

a neutral feedback amplifier for detecting a neutral potential of terminal voltages of the motor, comparing the neutral potential with a reference voltage, outputting a first output to the buffer circuit when the neutral potential is higher than the reference voltage, and outputting a second output to the buffer circuit when the neutral potential is lower than the reference voltage;

a phase signal generating circuit for generating a phase signal based on the position signal;

a trapezoidal phase signal generating circuit for generating a trapezoidal phase signal in response to the phase signal;

a commutation switching control signal generating circuit for generating commutation switching control signals in response to the position signal; and a soft switching circuit for generating the commutation switching signals in response to the trapezoidal phase signal and the commutation switching control signals wherein the buffer circuit lowers the neutral potential when the neutral potential is higher than the reference voltage and raises the neutral potential when the neutral potential is lower than the reference voltage.

3. The sensorless brushless motor driving circuit according to claim 1, wherein the neutral feedback amplifier comprises:

first and second differentially connected transistors;

a reference source producing a reference voltage and connected to a base of the first transistor; and means connecting a base of the second transistor to terminals of the motor for detecting a neutral potential, wherein the neutral potential of the terminal voltages of the motor is maintained at the reference voltage by supplying a control signal from the second transistor when the neutral potential is higher than the reference voltage, and by supplying a control signal from the first transistor when the neutral potential is lower than the reference voltage.

4. The sensorless brushless motor driving circuit according to claim 2, wherein the neutral feedback amplifier comprises:

first and second differentially connected transistors;

a reference source producing a reference voltage and connected to a base of the first transistor; and means connecting a base of the second transistor to terminals of the motor for detecting a neutral potential, wherein the neutral potential of the terminal voltages of the motor is maintained at the reference voltage by supplying a control signal from the second transistor when the neutral potential is higher than the reference voltage, and by supplying a control signal from the first transistor when the neutral potential is lower than the reference voltage.

5. The sensorless brushless motor driving circuit according to claim 3, wherein the neutral feedback amplifier further comprises:

third and fourth transistors connected to a collector of the first transistor forming a first current-mirror circuit, fifth and sixth transistors connected to a collector of the second transistor forming a second current-mirror circuit, and seventh and eighth transistors connected to a collector of the sixth transistor forming a third current-mirror circuit, wherein the neutral feedback amplifier pushes current via the second and the third current-mirror circuits when current flows through the second transistor, and pulls current via the first current-mirror circuit when current flows through the first transistor.

6. The sensorless brushless motor driving circuit according to claim 4, wherein the neutral feedback amplifier further comprises:

third and fourth transistors connected to a collector of the first transistor forming a first current-mirror circuit, fifth and sixth transistors connected to a collector of the second transistor forming a second current-mirror circuit, and seventh and eighth transistors connected to a collector of the sixth transistor forming a third current-mirror circuit, wherein the neutral feedback amplifier pushes current via the second and the third current-mirror circuits when current flows through the second transistor, and pulls current via the first current-mirror circuit when current flows through the first transistor.

7. The sensorless brushless motor driving circuit according to claim 1, wherein the buffer circuit includes a buffer for every phase of the motor, each buffer receiving a commutation switching signal from the commutation switching circuit and first and second control signals from the neutral feedback amplifier, outputting first and second driving signals for driving the motor driving transistor circuit according to the commutation switching signals from the commutation switching circuit, increasing and decreasing the first driving signal according to the first control signal from the neutral feedback amplifier and increasing and decreasing the second driving signal according to the second control signal from the neutral feedback amplifier.

8. The sensorless brushless motor driving circuit according to claim 2, wherein the buffer circuit includes a buffer for every phase of the motor, each buffer receiving a commutation switching signal from the commutation switching circuit and first and second control signals from the neutral feedback amplifier, outputting first and second driving signals for driving the motor driving transistor circuit according to the commutation switching signals from the commutation switching circuit, increasing and decreasing the first driving signal according to the first control signal from the neutral feedback amplifier and increasing and decreasing the second driving signal according to the second control signal from the neutral feedback amplifier.

9. The sensorless brushless motor driving circuit according to claim 7, wherein each buffer comprises:

a first transistor for receiving a commutation switching signal from the commutation switching circuit at a base terminal, and for receiving the first control signal from the neutral feedback amplifier at an emitter terminal, a first current-mirror circuit for supplying a current flowing through a collector terminal of the first transistor to a first output terminal, a second transistor for receiving a commutation switching signal from the commutation switching circuit at a base terminal, and for receiving the second control signal from the neutral feedback amplifier at an emitter terminal, a second current-mirror circuit taking out current flowing through a collector terminal of the second transistor; and a third current-mirror circuit for supplying a current flowing through the second current-mirror circuit to a second output terminal wherein the buffer circuit outputs driving signals for driving the motor driving transistors circuit according to the signals at the first and second output terminals, increasing and decreasing the driving signal at the first terminal according to the first control signal, and increasing or decreasing the driving signal of the second terminal according to the second control signal.

10. The sensorless brushless motor driving circuit according to claim 8 wherein each buffer comprises:

a first transistor for receiving a commutation switching signal from the commutation switching circuit at a base terminal, and for receiving the first control signal from the neutral feedback amplifier at an emitter terminal, a first current-mirror circuit for supplying a current flowing through a collector terminal of the first transistor to a first output terminal, a second transistor for receiving a commutation switching signal from the commutation switching circuit at a base terminal, and for receiving the second control signal from the neutral feedback amplifier at an emitter terminal, a second current-mirror circuit taking out current flowing through a collector terminal of the second transistor; and a third current-mirror circuit for supplying a current flowing through the second current-mirror circuit to a second output terminal wherein the buffer circuit outputs driving signals for driving the motor driving transistors circuit according to the signals at the first and second output terminals, increasing and decreasing the driving signal at the first terminal according to the first control signal, and increasing or decreasing the driving signal of the second terminal according to the second control signal.

11. The sensorless brushless motor driving circuit according to claim 2, wherein the commutation switching control signal generating circuit comprises:

a plurality of rising edge detection circuits and falling edge detecting circuits for detecting respective rising and falling of position signals having a U-phase, a V-phase and a W-phase, an OR circuit connected to outputs of the rising edge detecting circuits and the falling edge detecting circuits, and a hexad counter for counting output pulses from the OR circuit.

12. The sensorless brushless motor driving circuit according to claim 2, wherein the soft switching circuit comprises:

a plurality of first intermediate current supplying circuits and second intermediate current supplying circuits for supplying intermediate currents and a commutation switching signal generating circuit generating commutation switching control signals based on each intermediate current received from the first and second intermediate current supplying circuits, wherein the first intermediate current supplying circuit comprises:

a first transistor for receiving a trapezoidal phase signal at a base terminal, a second transistor differentially connected to the first transistor for receiving a first reference voltage at a base terminal, a third transistor connected between a collector terminal of the second transistor and a power source, a first constant current source and a first switch connected in series between an emitter of the first transistor and a ground, and a second constant current source and a second switch connected in series between an emitter of the second transistor and a ground, wherein the first intermediate current supplying circuit turns off the first transistor and the second transistor when the commutation switching control signal is logic "H", turns on the first transistor and the second transistor when the commutation switching control signal is logic "L", compares a trapezoidal phase signal from a trapezoidal phase signal generating circuit with the first reference voltage to supply an intermediate current as an inversion of the trapezoidal phase signal to a transistor in the commutation switching signal generating circuit, current-mirror connected to the third transistor;

the second intermediate current supplying circuit comprises:

a fourth transistor for receiving the trapezoidal phase signal at a base terminal, a fifth transistor differentially connected to the fourth transistor for receiving a second reference voltage at a base terminal, a sixth transistor connected between a collector terminal of the fourth transistor and a power source, a third constant current source and a third switch connected in series between an emitter of the fourth transistor and a ground, and a fourth constant current source and a fourth switch connected in series between an emitter of the fifth transistor and a ground, wherein the second intermediate current supplying circuit turns off the fourth transistor and the fifth transistor when the commutation switching control signal from the commutation switching control signal generating circuit is logic "H", turns on the fourth transistor and the fifth transistor when the commutation switching control signal is logic "L", and compares the trapezoidal phase signal from the trapezoidal phase signal generating circuit with the second reference voltage to supply an intermediate current as the inverted trapezoidal phase signal to a transistor in the commutation switching signal generating circuit, current-mirror connected to the third transistor;

said commutation switching signal generating circuit comprises:

a plurality of first transistor groups and second transistor groups, respective transistors being current-mirror connected to current supplying transistors in the intermediate current supplying circuits, and an emitter of each transistor being connected to the power source, the first and second transistor groups including respective first to sixth transistors, a first resistor whose one end is connected to collectors of the first and second transistors of the first transistor group, a second resistor whose one end is connected to collectors of the third and fourth transistors of the first transistor group, a third resistor whose one end is connected to collectors of the fifth and sixth transistors of the first transistor group, a voltage source whose one end is connected to the other ends of the first, second and third resistors and whose other ends are connected to ground, a first current-mirror circuit comprising one and other transistors, a collector of the one transistor being connected to collectors of the second and third transistors of the second transistor group and a collector of the other transistor being connected to one end of the third resistor, a second current-mirror circuit comprising one and other transistors, a collector of the one transistor being connected to collectors of the fourth and fifth transistors of the second transistor group and a collector of the other transistor being connected to one end of the second resistor, a third current-mirror circuit comprising one and other transistors, a collector of the one transistor being connected to collectors of the sixth and first transistors of the second transistor group and a collector of the other transistor being connected to one end of the first resistor, a first constant current source connected between the source and the one end of the first resistor, a second constant current source connected between the source and the one end of the second resistor, a third constant current source connected between the source and the one end of the third resistor, a third output terminal connected to the one end of the first resistor, a second output terminal connected to the one end of the second resistor, and a first output terminal connected to the one end of the third resistor, wherein the circuit supplies the commutation switching signals based on the commutation switching control signals.

13. The sensorless brushless motor driving circuit according to claim 2, wherein the phase signal generating circuit comprises:

a first AND gate for receiving U-phase and V-phase position signals, a second AND gate for receiving V-phase and W-phase position signals, a third AND gate for receiving W-phase and U-phase position signals, and a NOR circuit receiving the output signals of each of the AND gates as input signals wherein the circuit generates a phase signal repeating logic "H" and logic "L" in turn according to the U-phase, V-phase, and W-phase position signals.

14. The sensorless brushless motor driving circuit according to claim 2, wherein the trapezoidal phase signal generating circuit comprises:

a switch turning on and off in response to the phase signal, a first constant current source connected between the power source and a first terminal of the switch, a second constant current source connected between a second terminal of the switch and the ground, and a capacitor connected to the first terminal of the switch and the ground wherein the circuit closes the switch when the phase signal is logic "H" for charging the capacitor and opens the switch when the phase signal is logic "L" for discharging the capacitor.

* * * * *